United States Patent
Yokoyama et al.

(10) Patent No.: US 12,387,303 B2
(45) Date of Patent: Aug. 12, 2025

(54) IMAGE CORRECTION METHOD, INFORMATION PROCESSING APPARATUS, AND NON-TRANSITORY COMPUTER-READABLE STORAGE MEDIUM

(71) Applicant: SEIKO EPSON CORPORATION, Tokyo (JP)

(72) Inventors: Issei Yokoyama, Sapporo (JP); Yuki Mori, Matsumoto (JP); Yoshiteru Uchiyama, Suwa (JP); Makoto Mikami, Yokohama (JP); Katsuyoshi Yamaguchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 171 days.

(21) Appl. No.: 18/457,398

(22) Filed: Aug. 29, 2023

(65) Prior Publication Data

US 2024/0070828 A1 Feb. 29, 2024

(30) Foreign Application Priority Data

Aug. 29, 2022 (JP) .................... 2022-135781

(51) Int. Cl.
*G06T 5/80* (2024.01)
*G06T 7/50* (2017.01)

(52) U.S. Cl.
CPC ............ *G06T 5/80* (2024.01); *G06T 7/50* (2017.01); *G06T 2207/10028* (2013.01)

(58) Field of Classification Search
None
See application file for complete search history.

(56) References Cited

U.S. PATENT DOCUMENTS

2014/0268065 A1 9/2014 Ishikawa et al.
2018/0284587 A1* 10/2018 Barnett ............... H04N 9/3179
(Continued)

FOREIGN PATENT DOCUMENTS

JP 2014-178393 A 9/2014
JP 2019-047311 A 3/2019

*Primary Examiner* — Frank S Chen
(74) *Attorney, Agent, or Firm* — Dority & Manning, P.A.

(57) ABSTRACT

An image correction method according to an aspect of the present disclosure includes receiving an input of selecting one of a first method for correcting a shape of an image projected from a projector onto a projection surface and a second method that is a method for correcting the shape of the image and is different from the first method, outputting a signal for causing the projector to project a first pattern image when the first method is selected, generating first correction data for correcting the shape of the image using the first method based on a first captured image that is acquired by imaging the projection surface and includes the projection surface and a first projection image appearing on the projection surface by projecting the first pattern image, outputting a signal for causing the projector to project a second pattern image different from the first pattern image when the second method is selected, and generating second correction data for correcting the shape of the image using the second method based on a second captured image that is acquired by imaging the projection surface and includes the projection surface and a second projection image appearing on the projection surface by projecting the second pattern image.

8 Claims, 12 Drawing Sheets

(56) References Cited

U.S. PATENT DOCUMENTS

| | | | |
|---|---|---|---|
| 2019/0005607 A1* | 1/2019 | Tamai | G03B 21/14 |
| 2019/0052851 A1* | 2/2019 | Korl | H04N 9/3194 |
| 2019/0052852 A1* | 2/2019 | Schick | G06T 7/593 |
| 2019/0073753 A1 | 3/2019 | Yamauchi | |

* cited by examiner

IMAGE CORRECTION METHOD, INFORMATION PROCESSING APPARATUS, AND NON-TRANSITORY COMPUTER-READABLE STORAGE MEDIUM

The present application is based on, and claims priority from JP Application Serial Number 2022-135781, filed Aug. 29, 2022, the disclosure of which is hereby incorporated by reference herein in its entirety.

BACKGROUND

1. Technical Field

The present disclosure relates to an image correction method, an information processing apparatus, and a non-transitory computer-readable storage medium storing a program.

2. Related Art

A technique for correcting an image projected on a projection surface is known.

For example, JP-A-2014-178393 discloses a system including an imaging device that captures images of a plurality of patterns projected on a projection surface and an image data output device that corrects, based on the captured patterns, image data corresponding to an image projected by a projector.

As disclosed in JP-A-2014-178393 that there are a plurality of examples of dot patterns, there are a plurality of types of pattern images. There are a plurality of methods for correcting a shape of an image projected on the projection surface.

However, pattern images used in these methods are not discussed. Therefore, there is room for improvement in terms of convenience for a user who performs an operation for correction.

SUMMARY

An image correction method according to an aspect of the present disclosure includes receiving an input of selecting one of a first method for correcting a shape of an image projected from a projector onto a projection surface and a second method that is a method for correcting the shape of the image and is different from the first method; outputting a signal for causing the projector to project a first pattern image when the first method is selected; generating first correction data for correcting the shape of the image using the first method based on a first captured image that is acquired by imaging the projection surface and includes the projection surface and a first projection image appearing on the projection surface by projecting the first pattern image; outputting a signal for causing the projector to project a second pattern image different from the first pattern image when the second method is selected; and generating second correction data for correcting the shape of the image using the second method based on a second captured image that is acquired by imaging the projection surface and includes the projection surface and a second projection image appearing on the projection surface by projecting the second pattern image.

An information processing apparatus according to an aspect of the present disclosure includes a processing device. The processing device is configured to receive an input of selecting one of a first method for correcting a shape of an image projected from a projector onto a projection surface and a second method that is a method for correcting the shape of the image and is different from the first method, output a signal for causing the projector to project a first pattern image when the first method is selected, generate first correction data for correcting the shape of the image using the first method based on a first captured image that is acquired by imaging the projection surface and includes the projection surface and a first projection image appearing on the projection surface by projecting the first pattern image, output a signal for causing the projector to project a second pattern image different from the first pattern image when the second method is selected, and generate second correction data for correcting the shape of the image using the second method based on a second captured image that is acquired by imaging the projection surface and includes the projection surface and a second projection image appearing on the projection surface by projecting the second pattern image.

A non-transitory computer-readable storage medium stores a program, and the program causes a computer to execute processing including receiving an input of selecting one of a first method for correcting a shape of an image projected from a projector onto a projection surface and a second method that is a method for correcting the shape of the image and is different from the first method, outputting a signal for causing the projector to project a first pattern image when the first method is selected, generating first correction data for correcting the shape of the image using the first method based on a first captured image that is acquired by imaging the projection surface and includes the projection surface and a first projection image appearing on the projection surface by projecting the first pattern image, outputting a signal for causing the projector to project a second pattern image different from the first pattern image when the second method is selected, and generating second correction data for correcting the shape of the image using the second method based on a second captured image that is acquired by imaging the projection surface and includes the projection surface and a second projection image appearing on the projection surface by projecting the second pattern image.

DESCRIPTION OF EMBODIMENTS

Figure 1:
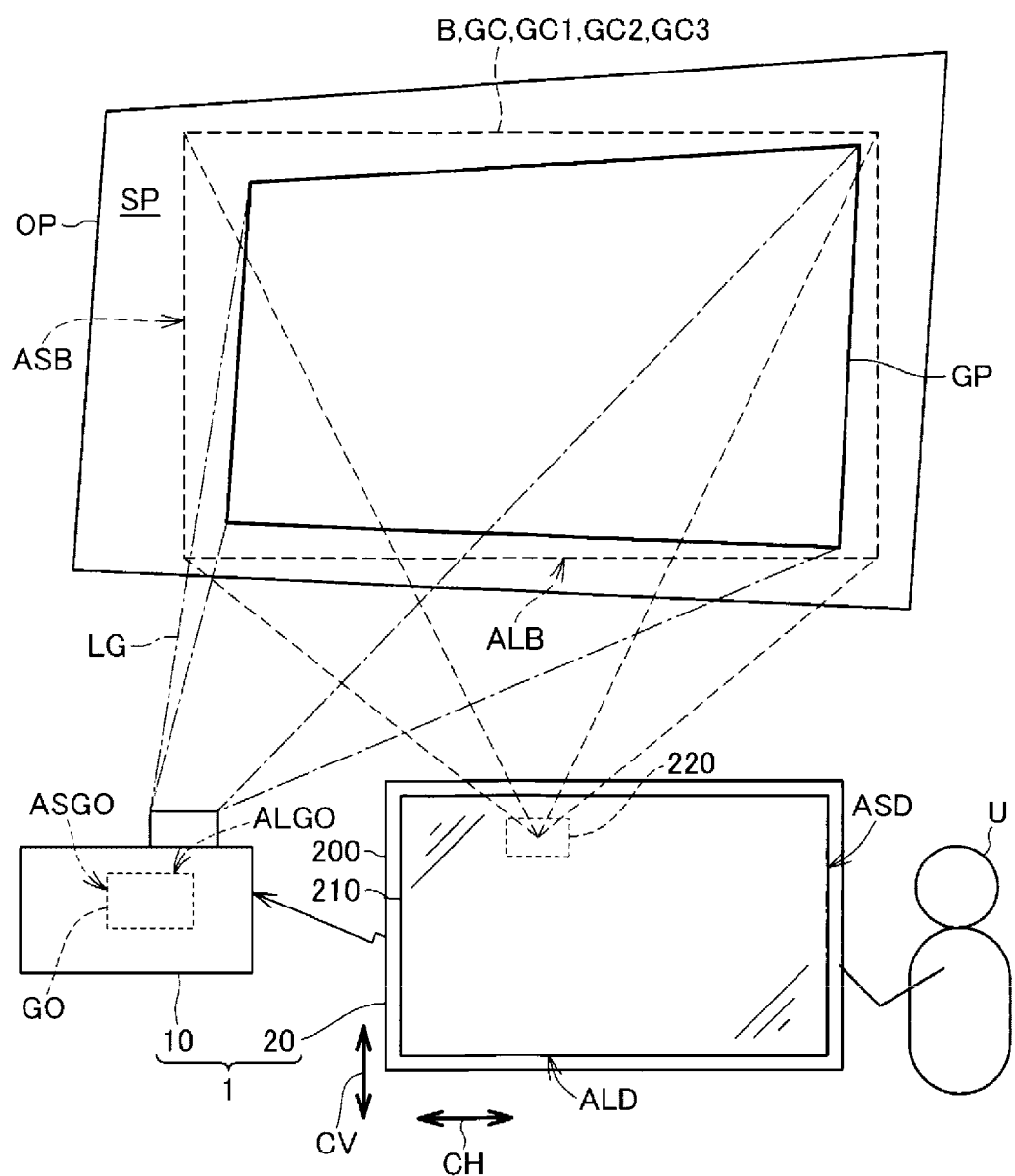
FIG. 1 is a diagram illustrating a configuration example of a projection system according to an embodiment of the present disclosure.

Hereinafter, preferred embodiments according to the present disclosure will be described with reference to the drawings. In the drawings, dimensions and scales of respective parts may be appropriately different from those of actual parts, and parts schematically illustrated for easy understanding may be included. In the following description, a scope of the present disclosure is not limited to embodiments described in the following description unless otherwise specified. In addition, the scope of the present disclosure includes equivalents of the embodiments.

1. Embodiment

Configuration of Projection System 1

FIG. 1 is a diagram schematically illustrating a configuration example of a projection system 1 according to an embodiment.

As illustrated in FIG. 1, the projection system 1 includes a projector 10 and an information processing apparatus 20.

The projector 10 is a device that projects image light LG of an image onto a projection surface SP based on image data DG. The projection surface SP is a surface of an object onto which the image light LG is projected. In the following description, an object onto which the image light LG is projected is referred to as a "projection object OP". An image projected on the projection surface SP is referred to as a "target image GO", and an image appearing on the projection surface SP by projecting the image light LG is referred to as a "projection image GP".

In the embodiment, the target image GO has a rectangular shape having a long side ALGO and a short side ASGO. It is assumed that the target image GO is projected from the projector 10 such that the short side ASGO is along a vertical CV. The short side ASOG of the target image GO does not need to be completely parallel to the vertical CV, and may be closer to the vertical CV than to a horizontal CH.

The information processing apparatus 20 is an example of a computer. The information processing apparatus 20 is an apparatus capable of transmitting a signal to the projector 10, and supplies a signal of image data DG to the projector 10. A signal transmission path between the information processing apparatus 20 and the projector 10 may be a wired path or a wireless path. A standard adopted for the transmission path is not particularly limited. FIG. 1 illustrates a configuration in which the transmission path is a wireless path.

The information processing apparatus 20 according to the embodiment is a portable apparatus that includes a casing 200, a display 210, and an imaging device 220. That is, the casing 200 has a size at which a user U can carry the casing 200, the display 210 and the imaging device 220 are housed in the casing 200, and the casing 200 is held by a hand of the user U. Representative examples of a specific form of the information processing apparatus 20 include a portable terminal such as a smartphone, a mobile phone, a tablet personal computer, or a laptop personal computer. The imaging device 220 may be provided separately from the information processing apparatus 20. In FIG. 1, the information processing apparatus 20 is illustrated in a form of a smartphone in which the imaging device 220 is provided.

Next, electrical configurations of the projector 10 and the information processing apparatus 20 will be described in more detail.

Configuration of Projector 10

Figure 2:
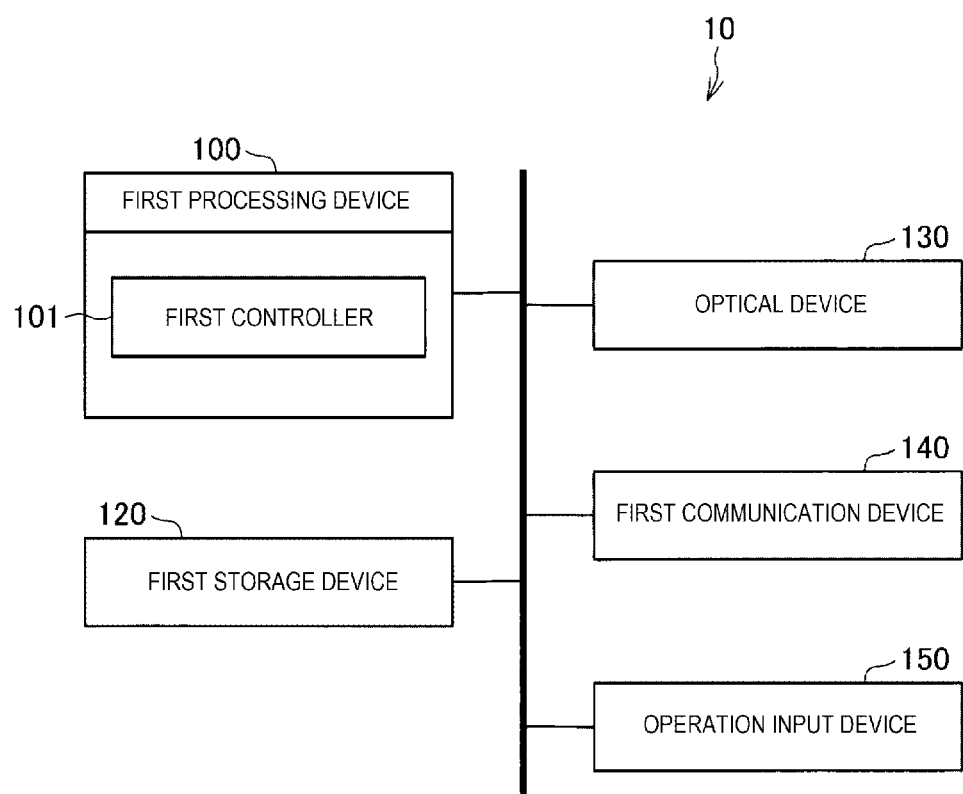
FIG. 2 is a diagram schematically illustrating an electrical configuration example of a projector.

FIG. 2 is a diagram illustrating an electrical configuration example of the projector 10.

As illustrated in FIG. 2, the projector 10 includes a first processing device 100, a first storage device 120, an optical device 130, a first communication device 140, and an operation input device 150, and these devices are coupled to a bus. The first processing device 100 includes one or more processors such as central processing units (CPUs). A part of functions of the first processing device 100 may be implemented by a circuit such as a field programmable gate array (FPGA). The first storage device 120 is a storage medium that can be read by the first processing device 100. The first storage device 120 includes, for example, a nonvolatile memory and a volatile memory. The nonvolatile memory is, for example, a read only memory (ROM), an erasable programmable read only memory (EPROM), or an electrically erasable programmable read only memory (EEPROM). The volatile memory is, for example, a random access memory (RAM).

The first processing device 100 according to the embodiment functions as a first controller 101 that controls units of the projector 10. The first processing device 100 may further function as another functional unit.

The optical device 130 is a device that emits the image light LG based on the target image GO under the control of the first controller 101. Specifically, the optical device 130 includes a light source, a light modulation device, and an optical system. The light source is a discharge lamp, a semi-conductor light source, or the like. Representative examples of the discharge lamp include a halogen lamp, a xenon lamp, and an ultra-high pressure mercury lamp. Representative examples of the semiconductor light source include a light-emitting diode (LED) and a laser diode. The light modulation device includes a light modulation element that optically modulates light of the light source under the control of the first controller 101. Examples of the light modulation element include a liquid crystal panel and a digital micromirror device. The light modulation element may be a single liquid crystal panel or a single digital mirror device, or may include a plurality of liquid crystal panels or digital mirror devices. The optical system includes one or more optical elements that adjust a magnification ratio and an image formation position of light output from the light modulation device. Light output from the optical system is emitted as the image light LG from the optical device 130 and is projected onto the projection surface SP.

The first communication device 140 is a device that communicates with the information processing apparatus 20. A communication method may be a wireless method or a wired method. When the communication method is a wireless method, the first communication device 140 includes a wireless communication module including an antenna, a radio frequency (RF) circuit, a baseband circuit, and the like. When the communication method is a wired method, the first communication device 140 includes a wired communication module including a connector to which a communication cable is connected and an interface circuit that processes a signal transmitted and received via the connector.

Various signals are transmitted from the information processing apparatus 20 to the projector 10 through the communication of the first communication device 140. Examples of the signals include a signal of the image data DG of the target image GO and signals of first correction data and second correction data to be described later.

The operation input device 150 is a device that receives an input that is based on an operation of a user U. The operation input device 150 is, for example, a button provided on a main body of the projector 10, or a remote controller that remotely controls the projector 10.

Configuration of Information Processing Apparatus 20

Figure 3:
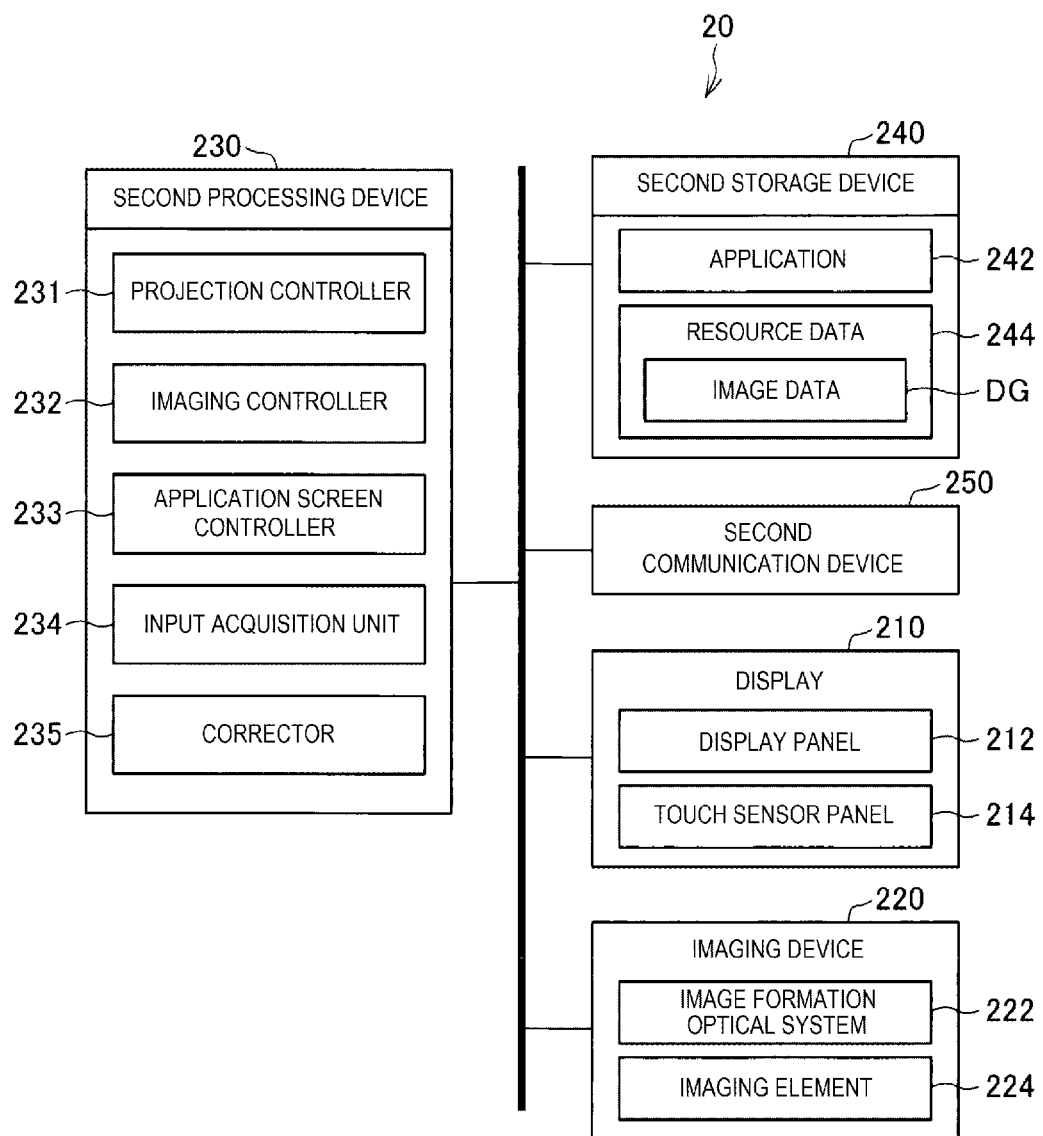
FIG. 3 is a diagram illustrating an electrical configuration example of an information processing apparatus.

FIG. 3 is a diagram illustrating an electrical configuration example of the information processing apparatus 20.

As illustrated in FIG. 3, the information processing apparatus 20 includes a second processing device 230, a second storage device 240, a second communication device 250, the display 210, and the imaging device 220, and these devices are coupled to a bus.

The second processing device 230 includes, for example, a processor such as the CPU.

The second storage device 240 includes, for example, the nonvolatile memory and the volatile memory.

The second communication device 250 is a device that communicates with the first communication device 140 of the projector 10. That is, the second communication device 250 includes the wireless communication module or the wired communication module compatible with a communication method and a communication standard corresponding to the first communication device 140.

The display 210 is a device that displays an image including various kinds of information. The display 210 according to the embodiment is also used as an input device. Specifically, the display 210 includes a display panel 212 that displays an image under the control of the second processing device 230, and a touch sensor panel 214 that outputs an input based on an operation of a user U. As illustrated in FIG. 1, an appearance shape of the display 210 according to the embodiment is a rectangular shape having a long side ALD and a short side ASD.

In the following description, a holding form in which a user U holds the casing 200 of the information processing apparatus 20 such that the long side ALD of the display 210 is along the vertical CV is referred to as "vertical holding". A holding form in which a user U holds the casing 200 of the information processing apparatus 20 such that the short side ASD of the display 210 is along the vertical CV is referred to as "lateral holding". The vertical holding is not limited to a posture in which the long side ALD of the display 210 is completely parallel to the vertical CV, and includes a posture in which the long side ALD is closer to the vertical CV than to the horizontal CH. The lateral holding is not limited to a posture in which the short side ASD of the display 210 is completely parallel to the vertical CV, and includes a posture in which the short side ASD is closer to the vertical CV than to the horizontal CH.

Referring back to FIG. 3, the imaging device 220 is a device that, under the control of the second processing device 230, images an external subject and outputs a captured image GC obtained by imaging the external subject. Specifically, the imaging device 220 includes an image formation optical system 222 and an imaging element 224. The image formation optical system 222 includes an optical element that forms a subject image on the imaging element 224. The imaging element 224 outputs a signal of the captured image GC of the subject image. In the imaging device 220, a shape of an imaging range B in a plan view is a rectangular shape having a long side ALB and a short side ASB as illustrated in FIG. 1. The shape of the imaging range B is defined by, for example, an outer shape of an imaging surface of the imaging element 224 and a masking shape of a mask provided in the image formation optical system 222.

In the information processing apparatus 20 according to the embodiment, orientations of the long side ALB and the short side ASB of the imaging range B coincide with directions of the long side ALD and the short side ASD of the display 210. That is, the long side ALB of the imaging range B is along the long side ALD of the display 210, and the short side ASB of the imaging range B is along the short side ASD of the display 210. Accordingly, when a user U images an object that is long in the horizontal CH such as the projection image GP, the user U can easily make an entire object fall within the imaging range B by holding the casing 200 of the information processing apparatus 20 in the form of lateral holding. The long side ALB and the short side ASB of the imaging range B do not need to be completely parallel to the long side ALD and the short side ASD of the display 210. The long side ALB and the short side ASB of the imaging range B may deviate from the long side ALD and the short side ASD of the display 210.

Returning to FIG. 3, the above-described second storage device 240 stores an application 242 and resource data 244. The application 242 is an example of a program. The resource data 244 is resource data used for executing the application 242. The resource data 244 includes, for example, data of a user interface image GAU corresponding to a screen of the application 242 and data such as the image data DG of a pattern image to be described later.

The application 242 according to the embodiment includes a program that causes the second processing device 230 to implement a function of executing image correction processing for correcting a shape of the target image GO. The second processing device 230 functions as a projection controller 231, an imaging controller 232, an application screen controller 233, an input acquisition unit 234, and a corrector 235 by executing the application 242.

The projection controller 231 controls projection of the target image GO projected by the projector 10. Specifically, the projection controller 231 controls the projector 10 to project the image light LG of the target image GO by providing a signal of the image data DG of the target image GO to the projector 10 via the second communication device 250.

The imaging controller 232 controls the imaging device 220 so as to cause the imaging device 220 to perform imaging, and acquires the captured image GC.

The application screen controller 233 performs control to switch user interface images GAU to be displayed on the display 210 as image correction processing proceeds.

Based on an output signal of the touch sensor panel 214, the input acquisition unit 234 acquires an input generated by a user U performs an operation on the user interface image GAU, thus receiving the input.

The corrector 235 generates correction data for correcting a shape of the target image GO.

The corrector 235 according to the embodiment generates correction data for correcting the shape of the target image GO using different methods depending on a type of the projection object OP. The methods are methods of generating correction data based on the captured image GC obtained by imaging the projection surface SP and the projection image GP when the projection image GP is projected from the projector 10 with pattern images having different patterns in these method as target images GO.

In the embodiment, the types of the projection object OP are classified according to whether the projection object OP is an article designed for projection. In the following description, the projection object OP that is not an article designed for projection is referred to as a "first-type projection object OP1", and the projection object OP that is an article designed for projection is referred to as a "second-type projection object OP2".

Representative examples of the first-type projection object OP1 include an indoor wall or an outdoor wall of a building.

Representative examples of the second-type projection object OP2 include a screen and a board sold for projection.

According to the classification in the embodiment, there are at least two differences between the first-type projection object OP1 and the second-type projection object OP2.

The first difference is as follows. That is, a projection range for the projection surface SP on a surface of the second-type projection object OP2 is defined by an outer shape including edges of the surface of the second-type projection object OP2, or a mark attached to the surface of the second-type projection object OP2. On the other hand, a range for the projection surface SP on a surface of the first-type projection object OP1 is not clearly defined.

The second difference is as follows. That is, most projection surfaces SP of the second-type projection objects OP2 are flat surfaces. On the other hand, most projection surfaces SP of the first-type projection objects OP1 are not flat surfaces. In the present disclosure, a flat surface is not limited to a completely flat surface. That is, the flat surface is a surface not having a shape on which distortion of a size that can be visually recognized by a viewer at a predetermined position occurs in a projection image GP in a state where the image light LG is projected from a position directly facing the projection surface SP. Examples of a shape of such a surface on which distortion occurs in the projection image GP include a flexed shape, a concave shape, and a convex shape in a depth direction of the projection surface SP. Examples of the flexed shape include a curved shape and a bent shape. The predetermined position is, for example, a position separated from the projection surface SP by a viewing distance defined by a specification of the projector 10 or the like.

According to the above two differences, it can be said that the second-type projection object OP2 is an article of which a projection range to be used as the projection surface SP is clearly defined and a surface of the projection range is a flat surface. On the other hand, the first-type projection object OP1 is an article of which a projection range to be used as the projection surface SP is not clearly defined and a surface of the projection surface SP may not be a flat surface.

Here, when the projection object OP corresponds to the first-type projection object OP1, since a surface of the projection surface SP is not a flat surface, the corrector 235 according to the embodiment corrects a shape of the target image GO using a method in which distortion caused by a shape of the surface of the projection surface SP can be eliminated. In the following description, this method is referred to as a "first method".

When the projection object OP corresponds to the second-type projection object OP2, the corrector 235 corrects a shape of the target image GO using a method in which the projection image GP can fall within a projection range of the projection surface SP. In the following description, this method is referred to as a "second method". Further, lines that define edges of the projection range of the projection surface SP on the second-type projection object OP2 are referred to as a "contour J". The contour J will be described later with reference to FIG. 5.

As described above, in both the first method and the second method, different pattern images are projected from the projector 10 as the target images GO. In the following description, a pattern image corresponding to the first method is referred to as a "first pattern image GOP1", and a pattern image corresponding to the second method is referred to as a "second pattern image GOP2". The second method according to the embodiment includes not only projecting the second pattern image GOP2 from the projector 10, but also projecting a third pattern image GOP3 different from the second pattern image GOP2 as the target image GO from the projector 10, which will be described in detail later.

In the following description, the projection image GP appearing on the projection surface SP by projecting the first pattern image GOP1 is referred to as a "first projection image GP1", and the captured image GC including the first projection image GP1 and the projection surface SP is referred to as a "first captured image GC1".

The projection image GP appearing on the projection surface SP by projecting the second pattern image GOP2 is referred to as a "second projection image GP2", and the captured image GC including the second projection image GP2 and the projection surface SP is referred to as a "second captured image GC2".

The projection image GP appearing on the projection surface SP by projecting the third pattern image GOP3 is referred to as a "third projection image GP3", and the captured image GC including the third projection image GP3 and the projection surface SP is referred to as a "third captured image GC3".

Example of Pattern Image

Figure 4:
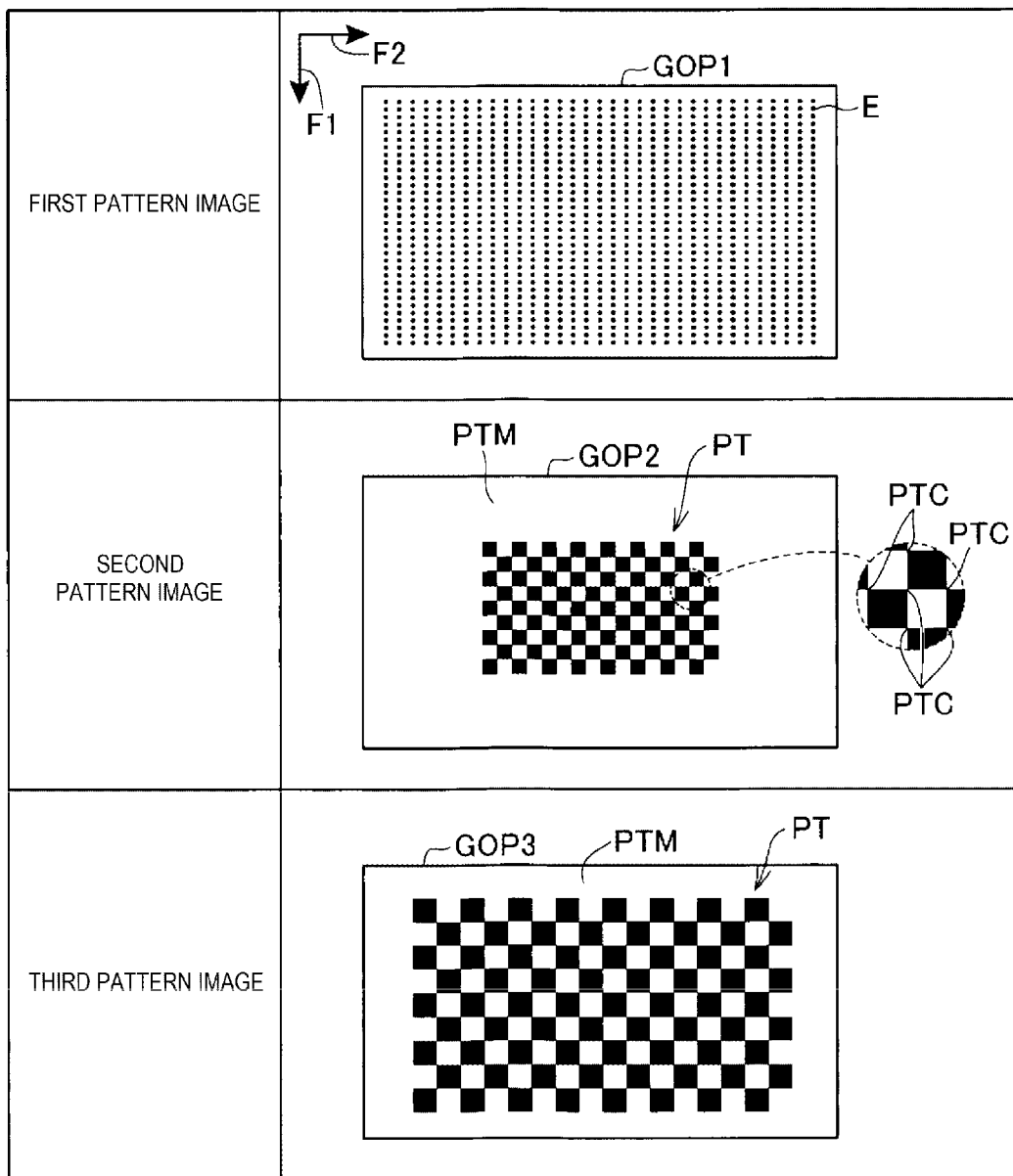
FIG. 4 is a diagram illustrating an example of a first pattern image, a second pattern image, and a third pattern image.

FIG. 4 is a diagram illustrating an example of the first pattern image GOP1, the second pattern image GOP2, and the third pattern image GOP3.

The first pattern image GOP1 is a rectangular image illustrating a pattern in which dots E are arranged at a predetermined interval in a vertical direction F1 and a lateral direction F2 in the image. Each dot E is a detection point on the projection surface SP, and corresponds to a point of a calculation target for a first correction amount. That is, as the density of the dots E increases, the projection surface SP is detected more precisely, and thus more precise correction is achieved.

The first correction amount calculated for the dots E that are detection points is a value for correcting an amount of deviation of a projection position in a depth direction, the deviation being caused by a shape of the surface of the projection surface SP, such as unevenness. That is, the corrector 235 according to the embodiment calculates the first correction amount for each dot E in the first pattern image GOP1 based on positions of the dots E in the first pattern image GOP1 and positions of the dots E in the first captured image GC1. The positions of the dots E in the first pattern image GOP1 are positions in a projector coordinate system, and the positions of the dots E in the first captured image GC1 are positions in a camera image coordinate system. The projector coordinate system is a coordinate system that uniquely specifies a position in the target image GO such as the first pattern image GOP1. The camera image coordinate system is a coordinate system that uniquely specifies a position in the captured image GC acquired through imaging performed by the imaging device 220.

By correcting a shape of the target image GO based on the first correction amount, it is possible to obtain the projection image GP in which distortion caused by a shape such as unevenness is prevented. The corrector 235 may calculate the first correction amount at a position among the dots E using interpolation based on the first correction amount of the dots E in the first pattern image GOP1.

In the embodiment, a method including calculation of the first correction amount using the first pattern image GOP1 corresponds to the above-described first method.

The second pattern image GOP2 is an image including a pattern portion PT in which quadrangles painted in a first color and quadrangles painted in a second color are alternately arranged in a vertical direction and a lateral direction. In the embodiment, the first color is white and the second color is black. A pattern indicated by the pattern portion PT is generally called a checker pattern. In the following description, vertexes of a quadrangle included in the pattern portion PT are referred to as "checker corners PTC".

The checker corners PTC of the pattern portion PT are detection points on the projection surface SP, and the detection points are used to obtain a correspondence relationship between the projector coordinate system and the camera image coordinate system. The pattern portion PT is used to detect a contour J defining a projection range on the second-type projection object OP2.

Specifically, the corrector 235 according to the embodiment obtains a projective transformation matrix based on positions of the checker corners PTC that are detection points in the second pattern image GOP2 and positions of checker corners PTC that are detection points in the second captured image GC2. The projective transformation matrix is a matrix for transforming the camera image coordinate system into the projector coordinate system. Further, the corrector 235 detects the contour J of the projection range on the second-type projection object OP2 based on lines at positions surrounding the entire pattern portion PT or a mark indicating a projection range for the second captured image GC2. The corrector 235 calculates a second correction amount for correcting a shape of the target image GO, such that the projection image GP falls within a projection range, based on the contour J in the captured image GC and the projective transformation matrix described above.

The corrector 235 may calculate a correction amount for correcting rotation of the projection image GP in a roll angle direction based on the positions of the checker corners PTC in the second pattern image GOP2 and positions of checker corners PTC in the captured image GC, and the correction amount may be included in the second correction amount. The roll angle direction is a rotation direction around a normal direction of the projection surface SP.

In the embodiment, a method including calculation of the second correction amount using the second pattern image GOP2 corresponds to the above-described second method.

Here, in the second method, even when the density of the checker corners PTC in the second pattern image GOP2 is smaller than the density of the dots E in the first pattern image GOP1, the contour J and a correspondence relationship between the projector coordinate system and the camera image coordinate system are obtained. In addition, as described above, since a surface of a projection range of the second-type projection object OP2 is relatively flat and distortion due to a shape such as unevenness on the surface is not conspicuous, it is not necessary to calculate the above-described first correction amount.

Accordingly, the density of the checker corners PTC that are detection points of the pattern portion PT in the second pattern image GOP2 is smaller than the density of the dots E that are detection points in the first pattern image GOP1.

As a result, the number of the checker corners PTC serving as detection points is smaller in the second pattern image GOP2 than in the first pattern image GOP1, and thus it is possible to speed up processing using the second pattern image GOP2.

Even when distortion occurs in the second projection image GP2 due to a shape such as unevenness of the surface of the projection surface SP, the number of checker corners PTC whose positions are deviated due to the distortion is reduced since the density of the checker corners PTC that are detection points is small. As a result, even when the surface of the projection surface SP includes a target shape such as unevenness, an influence of the shape is prevented, and a situation in which the second correction amount is not obtained normally and generation of second correction data is failed is prevented. In other words, in the calculation of the second correction amount and the generation of the second correction data, resistance to a noise and a detection error such as position deviation of the checker corners PTC is increased.

In the second pattern image GOP2 according to the embodiment, a size of the pattern portion PT is relatively small at the center of the second pattern image GOP2, and a margin region PTM with no pattern is provided around the pattern portion PT. The size of the pattern portion PT is, for example, ½ of a size of the second pattern image GOP2.

According to the second pattern image GOP2, even if the second projection image GP2 is larger than the projection range, the certainty that the pattern portion PT in the second projection image GP2 falls within a projection range is increased.

Figure 5:
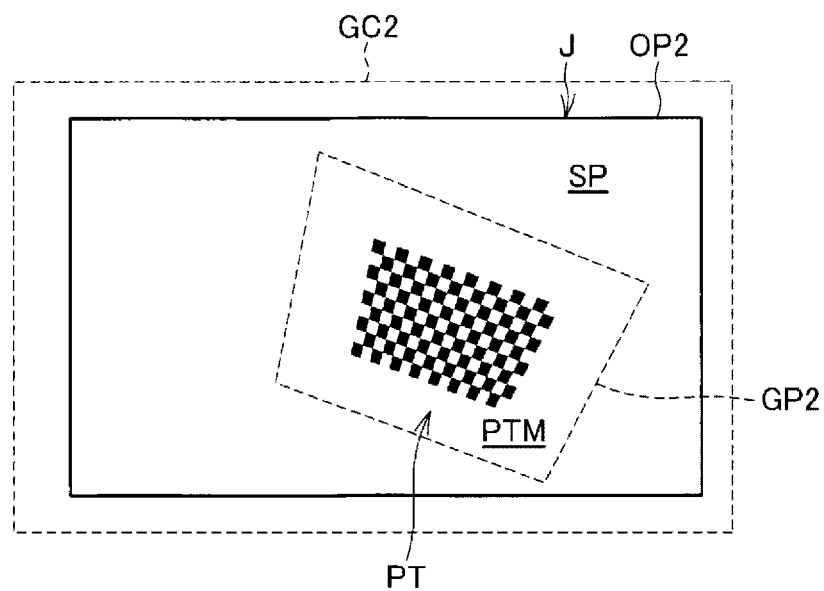
FIG. 5 is a diagram illustrating a relationship between a contour of a projection range and a pattern portion when the second pattern image is projected on a projection surface.

Since the size of the pattern portion PT is small, for example, as illustrated in FIG. 5, the pattern portion PT in the second projection image GP2 tends to be smaller than the contour J indicating the projection range of the projection surface SP. On the other hand, the projective transformation matrix indicating the correspondence relationship between the projector coordinate system and the camera image coordinate system and the contour J of the projection range are obtained with higher accuracy as the pattern portion PT appears larger in the projection range.

That is, there is room for improvement in the accuracy of the second correction amount obtained using the second pattern image GOP2.

Here, the second method according to the embodiment includes projecting the third pattern image GOP3 different from the second pattern image GOP2 from the projector 10 after the contour J and the projective transformation matrix are obtained based on the second captured image GC2, and obtaining the contour J and the projective transformation matrix again based on the third captured image GC3 obtained by capturing the third projection image GP3 that appears through the projection of the third pattern image GOP3.

According to the second method, the accuracy of the contour J and the projective transformation matrix is increased, and as a result, the accuracy of the second correction amount is also increased.

As illustrated in FIG. 4, the third pattern image GOP3 in the second method is an image in which a size of the pattern portion PT is larger than that in the second pattern image GOP2. More specifically, the pattern portion PT of the third pattern image GOP3 is enlarged based on a distance between the contour J obtained based on the second captured image GC2 and the pattern portion PT in the second captured image GC2 with reference to the size of the pattern portion PT of the second pattern image GOP2. The third pattern image GOP3 is generated by, for example, the corrector 235.

Operation of Information Processing Apparatus

A: Image Correction Processing

Figure 6:
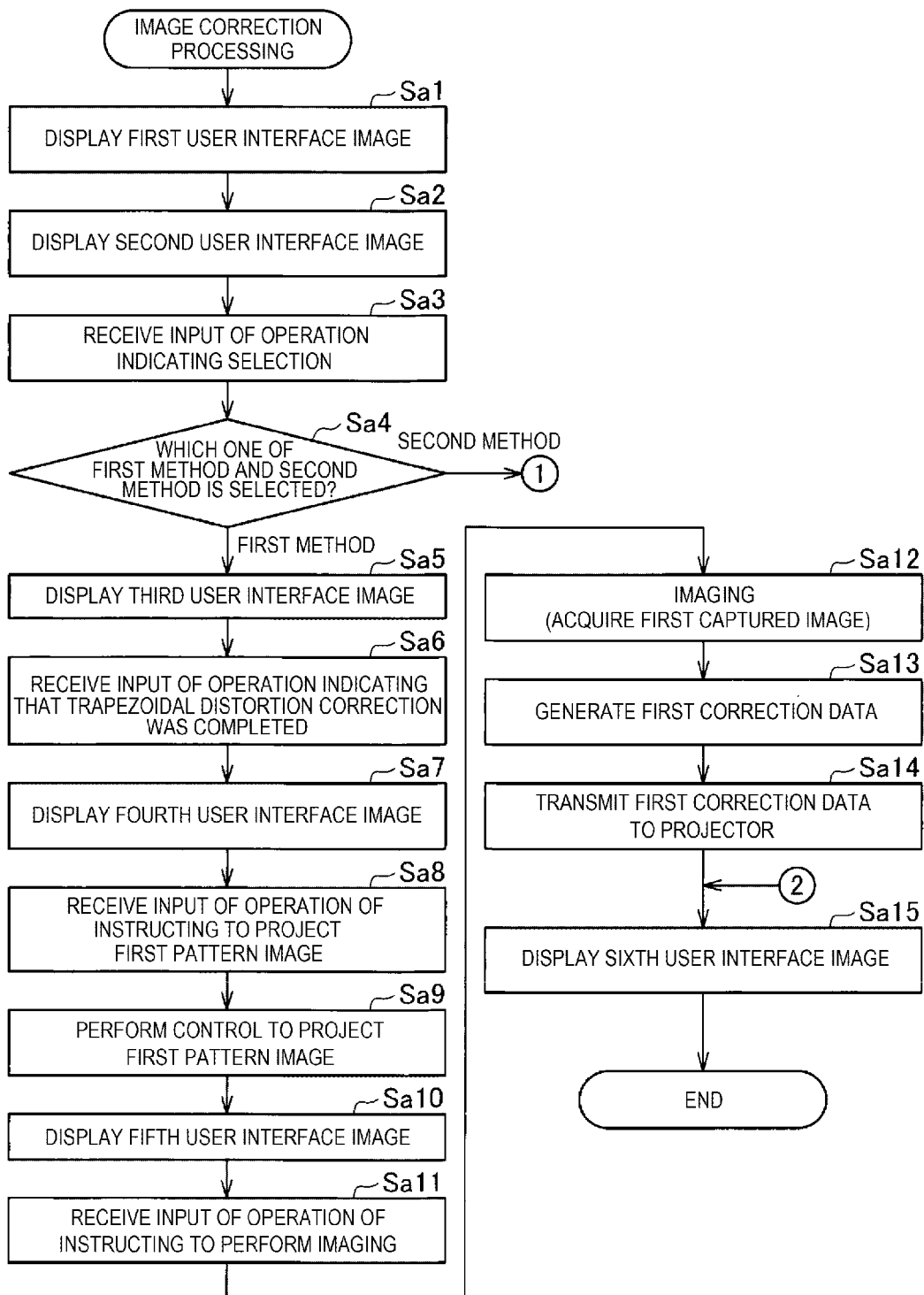
FIG. 6 is a flowchart illustrating an example of image correction processing executed by the information processing apparatus.
Figure 7:
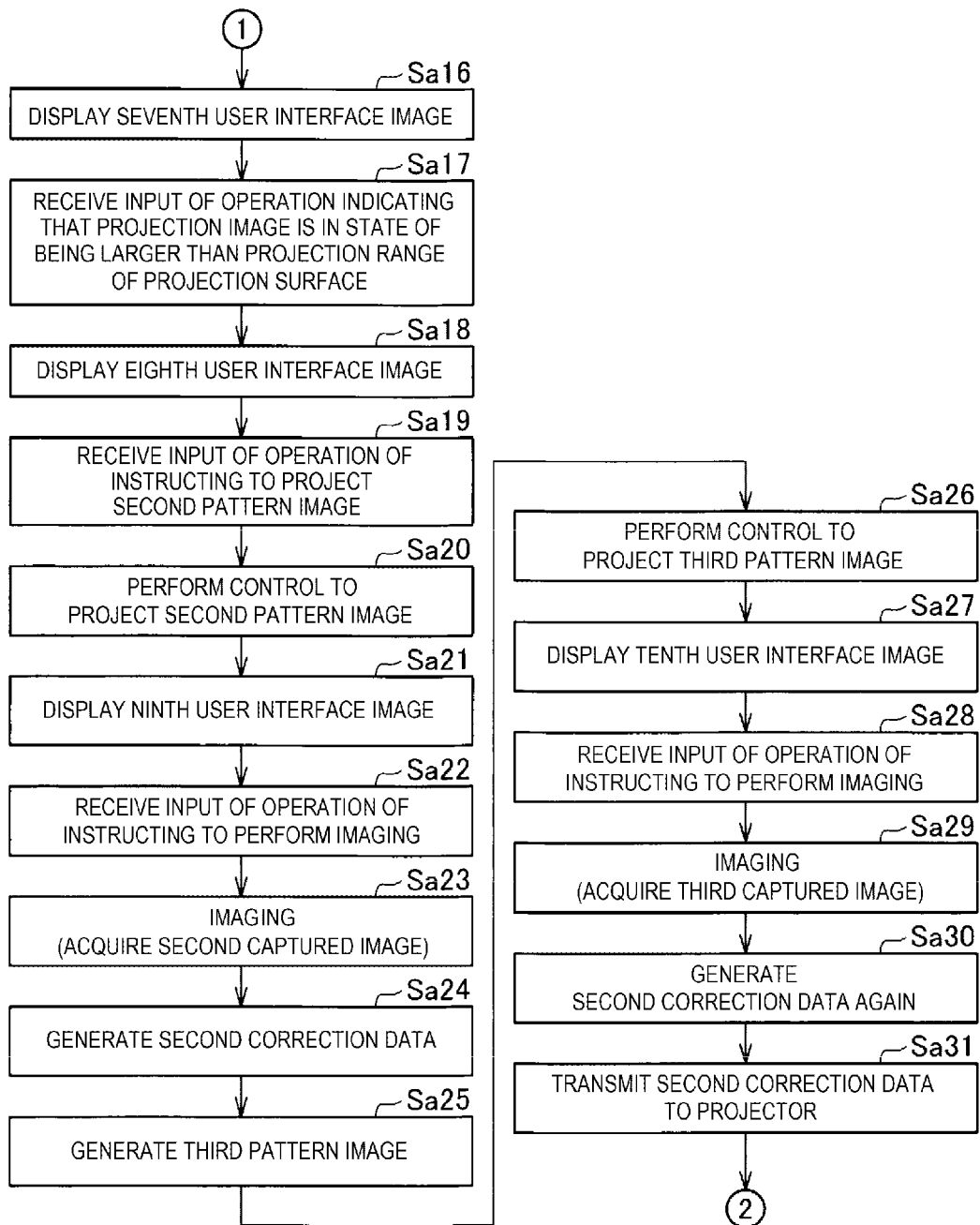
FIG. 7 is a flowchart illustrating the example of the image correction processing executed by the information processing apparatus.
Figure 8:
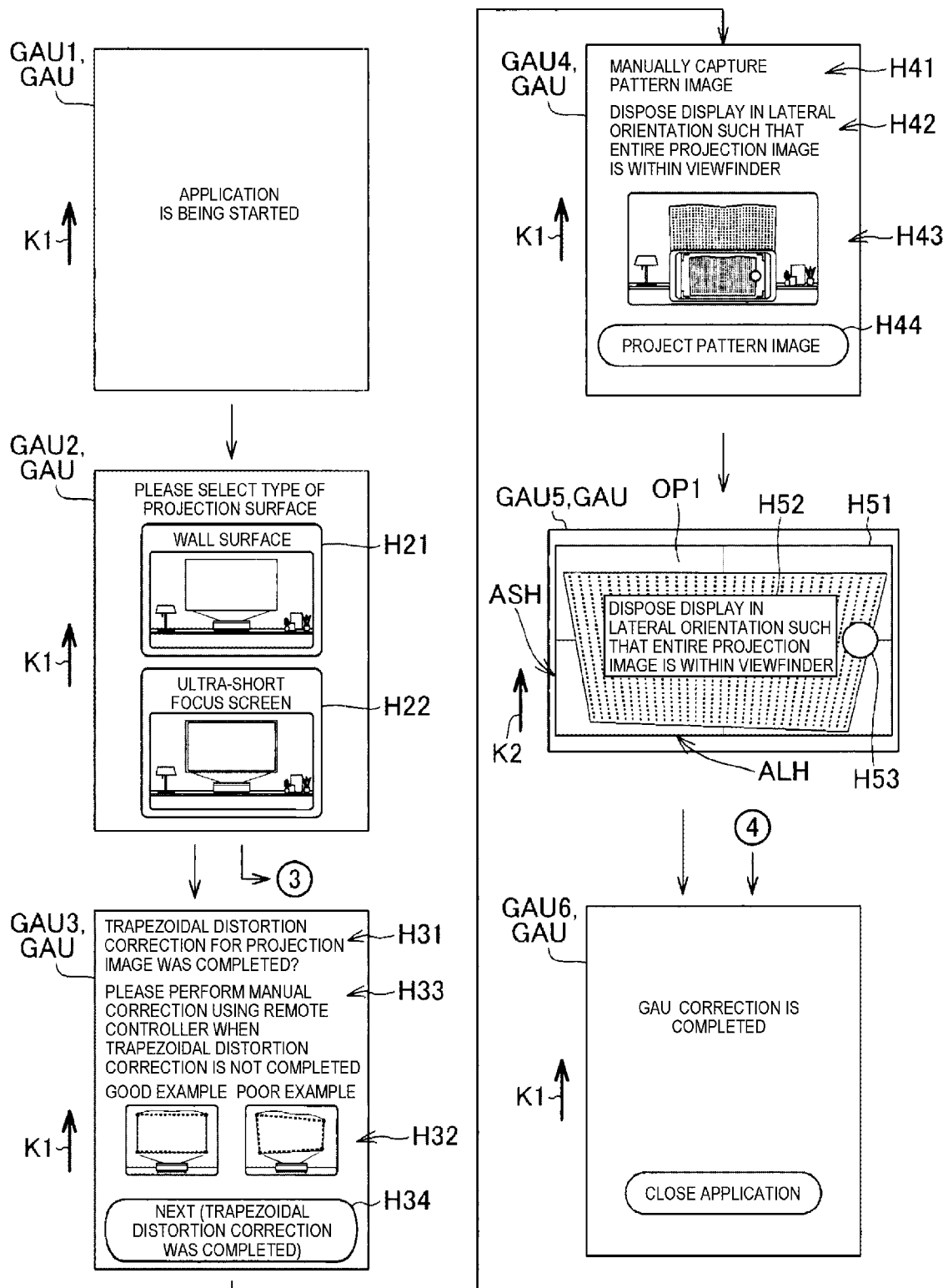
FIG. 8 is a diagram illustrating an example of transition of user interface images displayed on a display as the image correction processing proceeds.
Figure 9:
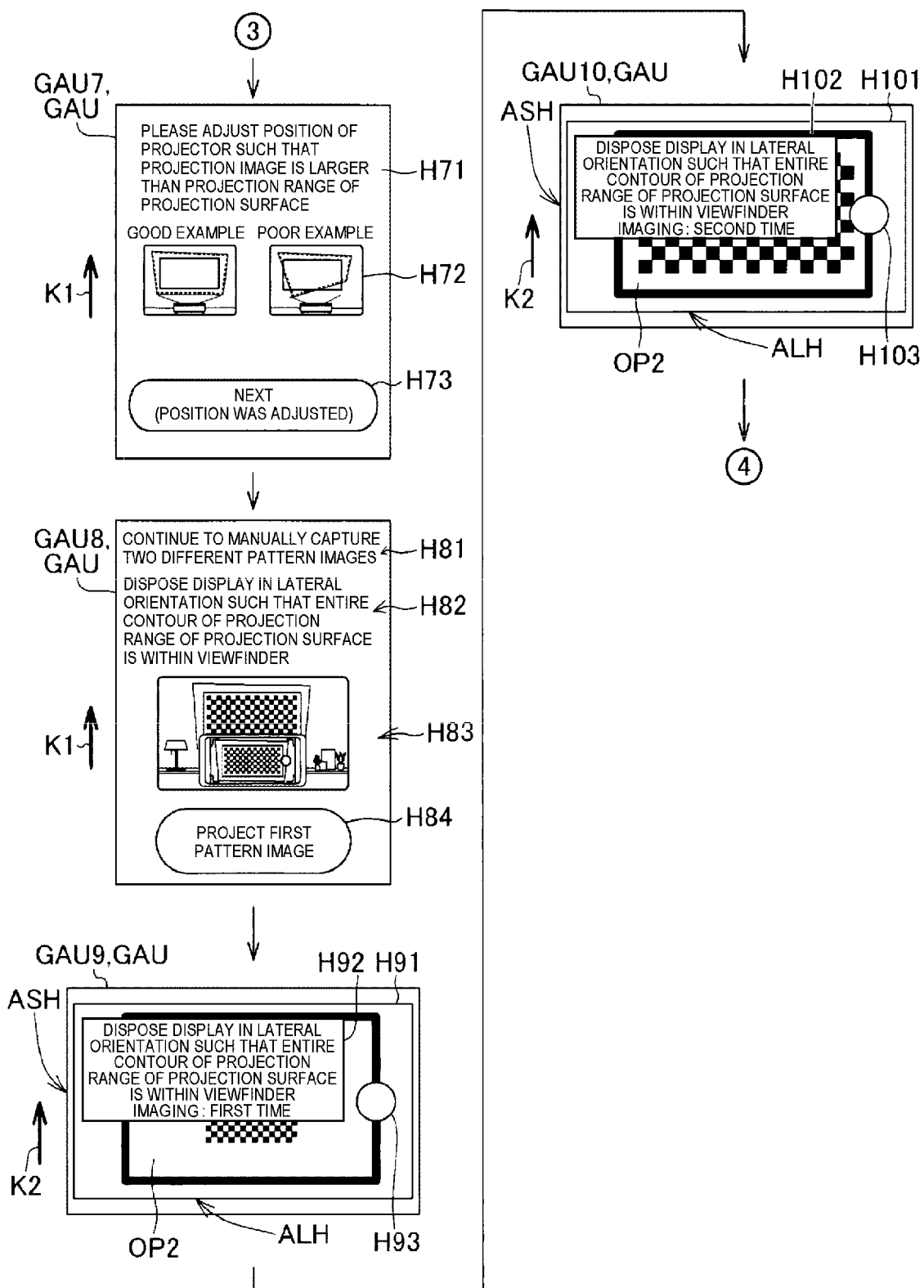
FIG. 9 is a diagram illustrating an example of transition of user interface images displayed on the display as the image correction processing proceeds.

FIGS. 6 and 7 are flowcharts illustrating an example of image correction processing executed by the information processing apparatus 20. FIGS. 8 and 9 are diagrams illustrating an example of transition of the user interface images GAU displayed on the display 210 as the image correction processing proceeds.

When the application 242 in the information processing apparatus 20 is started, as illustrated in FIG. 6, the application screen controller 233 of the second processing device 230 displays a first user interface image GAU1 on the display 210 (step Sa1). As illustrated in FIG. 8, the first user interface image GAU1 is an image for notifying a user U that the application 242 is being started.

Next, as illustrated in FIG. 6, the application screen controller 233 displays a second user interface image GAU2 on the display 210 (step Sa2). As illustrated in FIG. 8, the second user interface image GAU2 is an image used to input an operation of selecting one of the first method and the second method.

As described above, the first method corresponds to a case where the projection object OP is the first-type projection object OP1. The second method corresponds to a case where the projection object OP is the second-type projection object OP2. As described above, the projection surface SP of the second-type projection object OP2 includes the contour J defining a projection range.

The second user interface image GAU2 includes a first selection candidate image H21 indicating the first-type projection object OP1 and a second selection candidate image H22 indicating the second-type projection object OP2 whose projection surface SP includes the contour J.

Display regions of the first selection candidate image H21 and the second selection candidate image H22 function as touch buttons on the display 210.

Accordingly, when the user U touches the first selection candidate image H21 or the second selection candidate image H22, the first method or the second method is selected.

As illustrated in FIG. 6, when the user U selects one of the first selection candidate image H21 and the second selection candidate image H22 by a touch operation, the input acquisition unit 234 receives an input of an operation indicating the selection (step Sa3). In step Sa3, selecting the first method or the second method includes selecting the first-type projection object OP1 or the second-type projection object OP2 as the projection object OP, that is, receiving a selection as to whether the projection surface SP includes the contour J defining a projection range.

The input acquisition unit 234 determines which one of the first method and the second method is selected by the user U based on whether the first selection candidate image H21 or the second selection candidate image H22 was touched (step Sa4).

When the first method is selected (step Sa4: first method), the application screen controller 233 displays a third user interface image GAU3 on the display 210 (step Sa5).

As illustrated in FIG. 8, the third user interface image GAU3 is an image for notifying the user U of the following four items.

The first item is to confirm that a trapezoidal distortion correction was completed. The second item is a shape of the projection image GP for which the trapezoidal distortion correction was completed. The third item is that the trapezoidal distortion correction is performed by a manual operation when the trapezoidal distortion correction is not completed. The fourth item is that it is necessary to input an operation indicating that the trapezoidal distortion correction was completed.

In the third user interface image GAU3, the user U is notified of the first item by character string information H31, the user U is notified of the second item by illustrations H32, the user U is notified of the third item by character string information H33, and the user U is notified of the fourth item by a button image H34. A display region of the button image H34 functions as a touch button on the display 210. When the user U touches the button image H34, an operation indicating that the trapezoidal distortion correction was completed is input.

Trapezoidal distortion is a phenomenon in which the projection image GP is distorted into a trapezoidal shape when the projector 10 is installed in a manner of being inclined relative to the projection surface SP. The trapezoidal distortion correction is performed by adjusting positions of one or more corners among four corners of the rectangular target image GO. The trapezoidal distortion correction implemented by a manual operation is performed by operating the operation input device 150 of the projector 10 by the user U so as to adjust a position of a corner of the target image GO.

As illustrated in FIG. 6, when the input acquisition unit 234 receives an input of an operation indicating that the trapezoidal distortion correction was completed (step Sa6), the application screen controller 233 displays a fourth user interface image GAU4 on the display 210 (step Sa7).

As illustrated in FIG. 8, the fourth user interface image GAU4 is an image for notifying the user U of the following three items.

The first item is to capture the first projection image GP1 by projecting the first pattern image GOP1. The second item is a description of an imaging method, and specifically, an orientation of the display 210 at the time of imaging. The third item is to input an operation of instructing the projector 10 to project the first pattern image GOP1.

In the fourth user interface image GAU4, the user U is notified of the first item by character string information H41, and the user U is notified of the second item by character string information H42 and an illustration H43. The user U is notified of the third item by a button image H44. A display region of the button image H44 functions as a touch button on the display 210. When the user U touches the button image H44, an operation of starting projection of the first pattern image GOP1 is input.

As illustrated in FIG. 6, when the input acquisition unit 234 receives an input of an operation of instructing the projection of the first pattern image GOP1 (step Sa8), the projection controller 231 performs control to project the first pattern image GOP1 from the projector 10 (step Sa9). Specifically, the projection controller 231 reads the image data DG of the first pattern image GOP1 from the second storage device 240. The projection controller 231 provides the image data DG to the projector 10 via the second communication device 250, and causes the projector 10 to project the first pattern image GOP1. As a result, the first pattern image GOP1 is projected from the projector 10, and the first projection image GP1 corresponding to the first pattern image GOP1 appears on the projection surface SP.

Next, the application screen controller 233 displays a fifth user interface image GAU5 on the display 210 (step Sa10).

As illustrated in FIG. 8, the fifth user interface image GAU5 is an image used to acquire, by manually image-capturing, the first captured image GC1 including the first projection image GP1 and the projection surface SP.

Specifically, the fifth user interface image GAU5 includes a viewfinder display region H51 for displaying a viewfinder video of the imaging device 220, character string information H52 for notifying the user U of an method of imaging the first projection image GP1, and a shutter button image H53.

In the embodiment, the viewfinder display region H51 is a rectangular region having a long side ALH and a short side ASH that have the same aspect ratio as the imaging range B. In the fifth user interface image GAU5, the viewfinder display region H51 is arranged in an orientation in which the short side ASD of the display 210 is parallel to the short side ASH of the viewfinder display region H51. With such an arrangement, a display area of the viewfinder display region H51 is larger than that when the viewfinder display region H51 is displayed in an orientation in which the short side ASH of the viewfinder display region H51 is parallel to the long side ALD of the display 210.

The character string information H52 is superimposed on the viewfinder display region H51, and visibility is ensured without being hindered by the viewfinder display region H51.

The shutter button image H53 is an image for inputting an operation of instructing to perform imaging, and a display region of the shutter button image H53 functions as a touch button. When the user U touches the shutter button image H53, an operation of instructing to perform imaging is input.

As illustrated in FIG. 6, when the input acquisition unit 234 receives an input of an operation of instructing to perform imaging (step Sa11), the imaging controller 232 controls the imaging device 220 to perform imaging (step Sa12). Through the imaging, the first captured image GC1 including the projection surface SP and the first projection image GP1 corresponding to the first pattern image GOP1 is acquired.

Next, the corrector 235 generates first correction data for correcting a shape of the target image GO based on the first captured image GC1 (step Sa13). The first correction data is data for correcting the shape of the target image GO using the first method described above. In the embodiment, the first correction data is data including the above-described first correction amount.

The projection controller 231 transmits the first correction data to the projector 10 via the second communication device 250 (step Sa14). In the projector 10, for example, the first controller 101 of the first processing device 100 corrects the shape of the target image GO based on the first correction data, thereby preventing distortion of the projection image GP.

Thereafter, the application screen controller 233 displays a sixth user interface image GAU6 on the display 210 (step Sa15).

As illustrated in FIG. 8, the sixth user interface image GAU6 is an image for notifying the user U that the correction was completed.

As illustrated in FIG. 6, when the user U selects the second method in step Sa3 (step Sa4: second method), as illustrated in FIG. 7, the application screen controller 233 displays a seventh user interface image GAU7 on the display 210 (step Sa16).

As illustrated in FIG. 9, the seventh user interface image GAU7 is an image for notifying the user U of the following three items.

The first item is that a position of the projector 10 is manually adjusted to a position where the projection image GP is in a state of being larger than the projection range of the projection surface SP. The second item is an example of a state in which the projection image GP is larger than the projection range of the projection surface SP. The third item is an input of an operation indicating that the position of the projector 10 was adjusted.

In the seventh user interface image GAU7, the user U is notified of the first item by character string information H71, and the user U is notified of the second item by illustrations H72. The user U is notified of the third item by a button image H73. A display region of the button image H73 functions as a touch button on the display 210. When the user U touches the button image H73, an operation indicating that the position of the projector 10 was adjusted and the projection image GP is in a state of being larger than the projection range of the projection surface SP is input.

As illustrated in FIG. 7, when the input acquisition unit 234 receives an input of an operation indicating that the projection image GP is in a state of being larger than the projection range of the projection surface SP (step Sa17), the application screen controller 233 displays an eighth user interface image GAU8 on the display 210 (step Sa18).

As illustrated in FIG. 9, the eighth user interface image GAU8 is an image for notifying the user U of the following three items. The first item is that imaging is performed each time the second pattern image GOP2 and the third pattern image GOP3 that are different from each other are projected. The second item is a description of an imaging method, and specifically, an orientation of the display 210 at the time of imaging. The third item is an input of an operation of instructing the projector 10 to project the second pattern image GOP2.

According to the notification of the first item, the user U is notified that the second method according to the embodiment includes performing imaging twice.

In the eighth user interface image GAU8, the user U is notified of the first item by character string information H81, the user U is notified of the second item by character string information H82 and an illustration H83, and the user U is notified of the third item by a button image H84. A display region of the button image H84 functions as a touch button on the display 210. When the user U touches the button image H84, an operation of starting projection of the second pattern image GOP2 is input.

As illustrated in FIG. 7, when the input acquisition unit 234 receives an input of an operation of instructing projection of the second pattern image GOP2 (step Sa19), the projection controller 231 performs control to project the second pattern image GOP2 from the projector 10 (step Sa20). Specific processing of the projection controller 231 in step Sa20 is the same as that in step Sag. As a result of the processing in step Sa20, the second pattern image GOP2 is projected from the projector 10, and the second projection image GP2 corresponding to the second pattern image GOP2 appears on the projection surface SP.

Next, the application screen controller 233 displays a ninth user interface image GAU9 on the display 210 (step Sa21).

As illustrated in FIG. 9, the ninth user interface image GAU9 is an image used to acquire, by manually image-capturing, the second captured image GC2 including the projection surface SP and the second projection image GP2.

Specifically, the ninth user interface image GAU9 includes a viewfinder display region H91, character string information H92, and a shutter button image H93. Shapes and orientations of appearances of the viewfinder display region H91, the character string information H92, and the shutter button image H93 are the same as those of the viewfinder display region H51, the character string information H52, and the shutter button image H53 on the fifth user interface image GAU5 illustrated in FIG. 8. An imaging method indicated by the character string information H92 is based on the second method.

As illustrated in FIG. 7, when the input acquisition unit 234 receives an input of an operation of instructing to perform imaging (step Sa22), the imaging controller 232 controls the imaging device 220 to image the projection surface SP (step Sa23). Through the imaging, the second captured image GC2 including the projection surface SP and the second projection image GP2 corresponding to the second pattern image GOP2 is acquired.

Next, the corrector 235 generates second correction data for correcting a shape of the target image GO based on the second captured image GC2 (step Sa24). The second correction data is data for correcting the shape of the target image GO using the second method described above. In the embodiment, the second correction data is data including the above-described second correction amount.

Next, the corrector 235 enlarges the pattern portion PT in the second pattern image GOP2 based on the contour J of a projection range indicated by the second correction data, and generates the third pattern image GOP3 including the pattern portion PT (step Sa25). Then, the projection controller 231 performs control to project the third pattern image GOP3 from the projector 10 (step Sa26). Specifically, the projection controller 231 provides the image data DG of the third pattern image GOP3 generated in step Sa25 to the projector 10 via the second communication device 250, and causes the projector 10 to project the third pattern image GOP3. As a result, the third pattern image GOP3 is projected from the projector 10, and the third projection image GP3 corresponding to the third pattern image GOP3 appears on the projection surface SP.

Next, the application screen controller 233 displays a tenth user interface image GAU10 on the display 210 (step Sa27).

As illustrated in FIG. 9, the tenth user interface image GAU10 is an image used to acquire, by manually image-capturing, the third captured image GC3 including the projection surface SP and the third projection image GP3 corresponding to the third pattern image GOP3.

Similar to the ninth user interface image GAU9, the tenth user interface image GAU10 includes a viewfinder display region H101, character string information H102, and a shutter button image H103. Shapes of appearances of the viewfinder display region H101, the character string information H102, and the shutter button image H103 are the same as those of the viewfinder display region H91, the character string information H92, and the shutter button image H93 of the ninth user interface image GAU9.

As illustrated in FIG. 7, when the input acquisition unit 234 receives an input of an operation of instructing to perform imaging (step Sa28), the imaging controller 232 controls the imaging device 220 to perform imaging (step Sa29). Through the imaging, the third captured image GC3 including the projection surface SP and the third projection image GP3 corresponding to the third pattern image GOP3 is acquired.

Next, the corrector 235 again generates the second correction data for correcting the shape of the target image GO based on the third captured image GC3 (step Sa30). As a result, more accurate second correction data is obtained.

Then, the projection controller 231 transmits the second correction data obtained in step Sa30 to the projector 10 via the second communication device 250 (step Sa31). In the projector 10, for example, the first controller 101 of the first processing device 100 corrects the shape of the target image GO based on the second correction data, thereby making the projection image GP fall within the projection range of the projection surface SP.

Thereafter, the application screen controller 233 proceeds the processing to step Sa15 described above, and displays the sixth user interface image GAU6 on the display 210.

In the above-described image correction processing, instead of the projector 10 correcting the shape of the target image GO based on the first correction data or the second correction data, the information processing apparatus 20 may correct the shape of the target image GO based on the first correction data or the second correction data. In this case, the transmission of the first correction data in step Sa14 and the transmission of the second correction data in step Sa31 are not necessary. In this case, the information processing apparatus 20 transmits the corrected target image GO to the projector 10.

B: User Interface Image Display Processing

As illustrated in FIGS. 8 and 9, as the image correction processing proceeds, the user interface images GAU from the first user interface image GAUL to the tenth user interface image GAU10 are displayed one by one on the display 210 under the control of the application screen controller 233 of the information processing apparatus 20.

The application screen controller 233 according to the embodiment displays the user interface image GAU that is a display target in either a first orientation K1 or a second orientation K2 according to whether the user interface image GAU that is a display target corresponds to a second image used for acquiring, by image capturing, the captured image GC including the projection surface SP on which the target image GO is projected from the projector 10 and the projection image GP appearing on the projection surface SP by projecting the target image GO from the projector 10.

Among a group of the user interface images GAU according to the embodiment, the fifth user interface image GAU5, the ninth user interface image GAU9, and the tenth user interface image GAU10 correspond to the second image. Among the group of user interface images GAU, an image other than the second image is referred to as a "first image". That is, in the embodiment, the first image corresponds to the first user interface image GAUL to the fourth user interface image GAU4 and the sixth user interface image GAU6 to the eighth user interface image GAU8.

Figure 10:
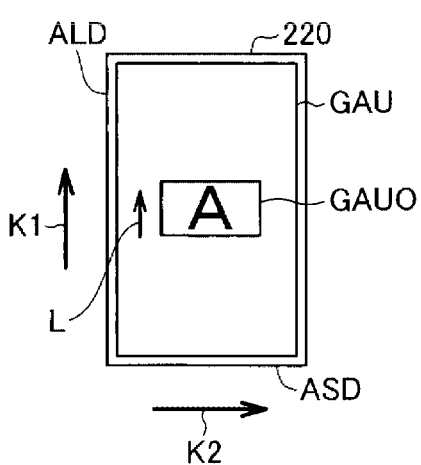
FIG. 10 is a diagram illustrating a first orientation, a second orientation, and an orientation of a user interface image.

FIG. 10 is a diagram illustrating the first orientation K1, the second orientation K2, and an orientation L of the user interface image GAU.

As illustrated in FIG. 10, the first orientation K1 is an orientation along the long side ALD of the display 210. The second orientation K2 is an orientation along the short side ASD of the display 210.

The orientation L of the user interface image GAU is determined by an orientation of an image object GAUO whose orientation is uniquely determined among image objects GAUO included in the user interface image GAU.

For example, as illustrated in a form A of FIG. 10, when the image object GAUO is an image for notifying a user U of information by a character string, the orientation L of the image object GAUO is an up-down orientation of a character of the character string.

For example, as illustrated in a form B of FIG. 10, when the image object GAUO is an image illustrating an iconic image such as an icon, the orientation L of the image object GAUO is an up-down orientation of the iconic image. The iconic image does not include only a simple figure such as a circle or a square whose up-down orientation is not specified.

Figure 11:
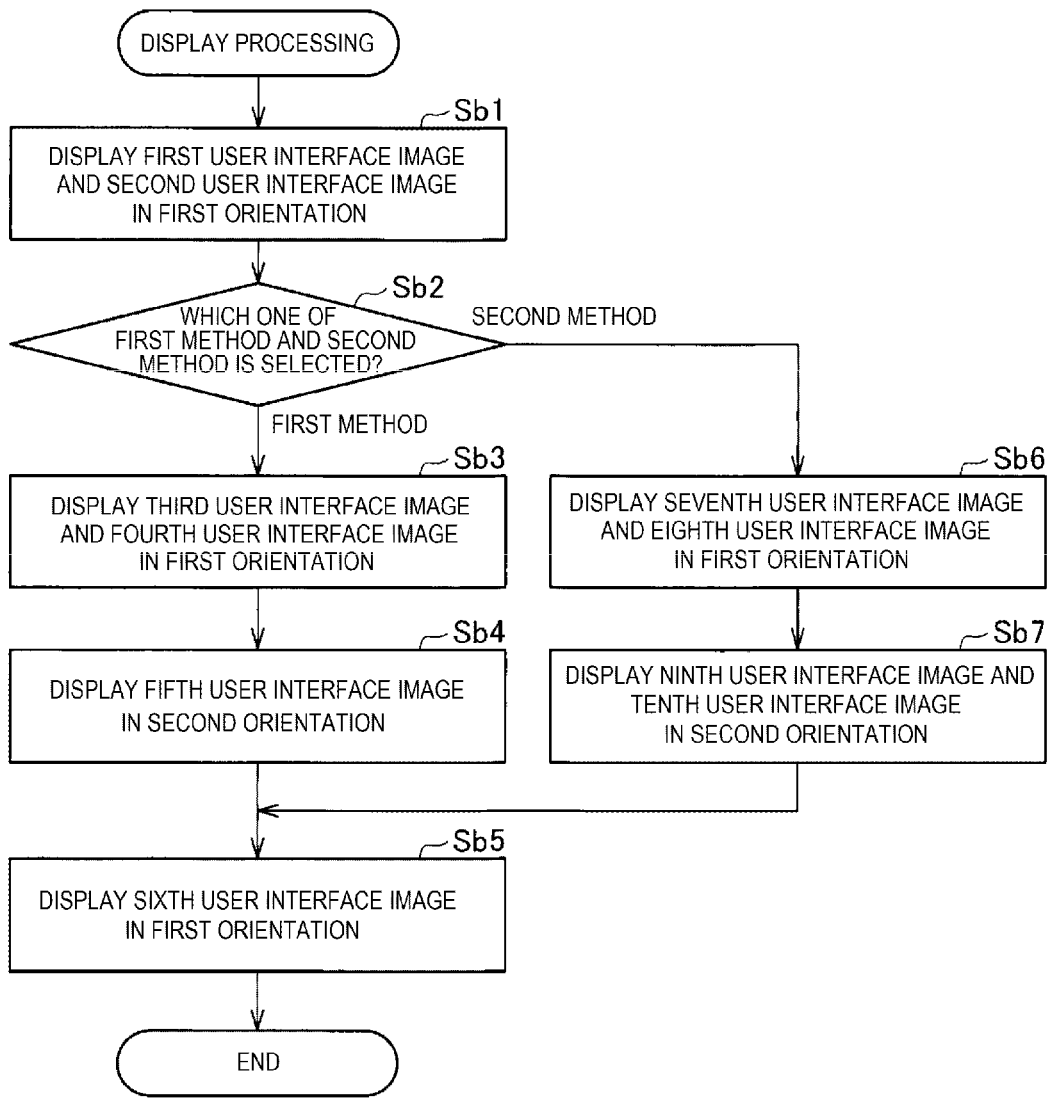
FIG. 11 is a flowchart illustrating an example of display processing executed by the information processing apparatus.

FIG. 11 is a diagram illustrating an example of display processing of the user interface images GAU as the image correction processing proceeds.

As illustrated in FIG. 11, the application screen controller 233 first displays the first user interface image GAUL and the second user interface image GAU2 with the orientation L being the first orientation K1 (step Sb1). Through the processing in step Sb1, as illustrated in FIG. 8, for example, the first selection candidate image H21 and the second selection candidate image H22 in the second user interface image GAU2 are displayed in a state of being oriented in the first orientation K1.

Next, as illustrated in FIG. 11, when the first method is selected in the second user interface image GAU2 (step Sb2: first method), the application screen controller 233 displays the third user interface image GAU3 and the fourth user interface image GAU4 with the third user interface image GAU3 and the fourth user interface image GAU4 oriented in the first orientation K1 (step Sb3). Through the processing in step Sb3, as illustrated in FIG. 8, for example, the character string information H41, H42, and the illustration H43 in the fourth user interface image GAU4 are displayed in a state of being oriented in the first orientation K1.

Next, the application screen controller 233 displays the fifth user interface image GAU5 corresponding to the second image in the second orientation K2 (step Sb4). Through the processing in step Sb4, as illustrated in FIG. 8, the character string information H52 in the fifth user interface image GAU5 is displayed in a state of being oriented in the second orientation K2.

When the fifth user interface image GAU5 is displayed in the second orientation K2, many users U hold the information processing apparatus 20 in a posture in which the short side ASD of the display 210 is close to the vertical CV, that is, in lateral holding as described above, in order to make it easy to read the character string information H52 indicating an imaging method. Accordingly, in a case where the fifth user interface image GAU5 is displayed in a state of being oriented in the second orientation K2, even when the fourth user interface image GAU4 immediately before the fifth user interface image GAU5 is displayed in a state of being oriented in the first orientation K1, the user U is induced to perform an operation of holding the information processing apparatus 20 in lateral holding.

On the other hand, the first projection image GP1 corresponding to projection of the first pattern image GOP1 has a rectangular shape that is long in the horizontal CH. As described above, in the information processing apparatus 20 according to the embodiment, orientations of the long side ALB and the short side ASB of the imaging range B respectively coincide with orientations of the long side ALD and the short side ASD of the display 210.

Accordingly, the first captured image GC1 including the entire first projection image GP1 is more reliably acquired by holding the information processing apparatus 20 in lateral holding.

As a result, it is possible to prevent a situation in which a part of a pattern in the first captured image GC1 is missing. As a result, it is possible to prevent a situation in which normal correction data cannot be obtained due to the missing of the pattern.

The character string information H52 included in the fifth user interface image GAU5 includes content for notifying a user U to hold the information processing apparatus 20 in lateral holding at the time of imaging.

Since the fifth user interface image GAU5 includes the character string information H52, an instruction to hold the information processing apparatus 20 in lateral holding is transmitted to the user U more reliably.

As illustrated in FIG. 11, thereafter, the application screen controller 233 displays the sixth user interface image GAU6 with the sixth user interface image GAU6 orientated in the first orientation K1 (step Sb5), and ends the processing.

When the second method is selected in the second user interface image GAU2 (step Sb2: second method), the application screen controller 233 displays the seventh user interface image GAU7 and the eighth user interface image GAU8 with the seventh user interface image GAU7 and the eighth user interface image GAU8 oriented in the first orientation K1 (step Sb6). Through the processing in step Sb6, as illustrated in FIG. 9, for example, the character string information H81, H82, and the illustration H83 in the eighth user interface image GAU8 are displayed in a state of being oriented in the first orientation K1.

Next, as illustrated in FIG. 11, the application screen controller 233 displays the ninth user interface image GAU9 and the tenth user interface image GAU10 that correspond to the second image with the ninth user interface image GAU9 and the tenth user interface image GAU10 oriented in the second orientation K2 (step Sb7). Through the processing in step Sb7, as illustrated in FIG. 9, the character string information H92 in the ninth user interface image GAU9 is displayed in a state of being orientated in the second orientation K2, and the character string information H102 in the tenth user interface image GAU10 is displayed in a state of being orientated in the second orientation K2.

Through the processing in step Sb7, similar to the processing in step Sb4, even when the eighth user interface image GAU8 immediately before the ninth user interface image GAU9 is displayed in a state of being orientated in the first orientation K1, a user U is induced to perform an operation of holding the information processing apparatus 20 in lateral holding. When the information processing apparatus 20 is held in lateral holding, the second captured image GC2 including the entire second projection image GP2 that is long in the horizontal CH and the third captured image GC3 including the entire third projection image GP3 are more reliably acquired.

Accordingly, it is possible to prevent a situation in which a part of patterns in the second captured image GC2 and the third captured image GC3 is missing. As a result, it is possible to prevent a situation in which normal correction data cannot be obtained due to the missing of the patterns.

The character string information H92 included in the ninth user interface image GAU9 and the character string information H102 included in the tenth user interface image GAU10 include contents for notifying the user U to hold the information processing apparatus 20 in lateral holding at the time of imaging.

Accordingly, similar to the fifth user interface image GAU5, the user U is more reliably notified of an instruction to hold the information processing apparatus 20 in lateral holding.

The second processing device 230 included in the information processing apparatus 20 described above executes the following series of pieces of processing. One piece of the processing is to receive an input for selecting a first method for correcting the shape of the target image GO projected from the projector 10 onto the projection surface SP or a second method that is a method for correcting the shape of the target image GO and is different from the first method (FIG. 6: step Sa3). One piece of the processing is to output a signal for causing the projector 10 to project the first pattern image GOP1 when the first method is selected (FIG. 6: step Sa9). One piece of the processing is to generate the first correction data for correcting the shape of the target image GO using the first method based on the first captured image GC1 that is acquired by imaging the projection surface SP and includes the projection surface SP and the first projection image GP1 appearing on the projection surface SP by projecting the first pattern image GOP1 (FIG. 6: step Sa13). One piece of the processing is to output a signal for causing the projector 10 to project the second pattern image GOP2 different from the first pattern image GOP1 when the second method is selected (FIG. 7: step Sa20). One piece of the processing is to generate the second correction data for correcting the shape of the target image GO using the second method based on the second captured image GC2 that is acquired by imaging the projection surface SP and includes the projection surface SP and the second projection image GP2 appearing on the projection surface SP by projecting the second pattern image GOP2 (FIG. 7: step Sa24).

When the second processing device 230 executes the series of processing, the first pattern image GOP1 and the second pattern image GOP2 that are different from each other and suitable in the first method and the second method are used.

Accordingly, it is possible to prevent, for example, a situation in which the accuracy of correction data is not high or a situation in which the correction data is not normally obtained and is failed when the same pattern image is used in both the first method and the second method.

As a result, the high-quality projection image GP is obtained by more accurate correction data, and a situation in which a user U repeats a correction operation for a plurality of times is prevented from occurring, so that convenience for the user U is improved.

In the embodiment, receiving the input (FIG. 6: step Sa3) includes receiving a selection as to whether the projection surface SP includes the contour J defining the projection range.

Accordingly, a user U can select the first method or the second method depending on whether the projection surface SP includes the contour J of the projection range, and appropriately perform the correction.

In the embodiment, the first method includes correcting the shape of the target image GO based on a shape of a surface of the projection surface SP.

According to the first method, a correction corresponding to a case where the surface of the projection surface SP is not a flat surface and distortion occurs in the projection image GP due to the shape of the surface can be appropriately performed by using the first pattern image GOP1.

In the embodiment, the second method includes correcting the projection image GP, appearing on the projection surface SP by the projector 10 projecting the target image GO, such that the projection image GP falls within the projection range of the projection surface SP.

According to the second method, a user U can appropriately perform a correction for making the projection image GP fall within the contour J of the projection range by using the second pattern image GOP2.

In the embodiment, the series of pieces of processing executed by the second processing device 230 includes the following processing. That is, when the second method is selected, a signal for causing the projector 10 to project the third pattern image GOP3 different from the first pattern image GOP1 and the second pattern image GOP2 is output (FIG. 7: step Sa26). Generating the second correction data includes generating the second correction data for correcting the shape of the target image GO using the second method based on the second captured image GC2 and the third captured image GC3 that is acquired by imaging the projection surface SP and includes the projection surface SP and the third projection image GP3 appearing on the projection surface SP by projecting the third pattern image GOP3 (FIG. 7: step Sa24 to step Sa30).

Through the above processing, the second correction data is more accurately obtained.

In the embodiment, the second pattern image GOP2 has fewer detection points than the first pattern image GOP1.

Accordingly, it is possible to speed up the processing using the second pattern image GOP2. In addition, in the generation of the second correction data, resistance to a detection error and a noise is increased.

The information processing apparatus 20 is a portable apparatus including the display 210 having the long side ALD and the short side ASD. The second processing device 230 of the information processing apparatus 20 executes the following series of pieces of processing. One piece of the processing is to display the first image on the display 210 (FIG. 11: steps Sb1 to Sb3, Sb5, and Sb6). In the embodiment, the first image corresponds to the first user interface image GAU1 to the fourth user interface image GAU4 and the sixth user interface image GAU6 to the eighth user interface image GAU8. One piece of the processing is to display, in an orientation along the short side ASD of the display 210, the second image used for acquiring, by image capturing, the captured image GC including the projection surface SP on which the target image GO is projected from the projector 10 and the projection image GP appearing on the projection surface SP by projecting the target image GO from the projector 10 (FIG. 11: Steps Sb4 and Sb7). In the embodiment, the second image corresponds to the fifth user interface image GAU5, the ninth user interface image GAU9, and the tenth user interface image GAU10.

Through the series of pieces of processing executed by the second processing device 230, the captured image GC including the entire projection image GP is reliably acquired by imaging performed by a user U.

In the embodiment, the series of pieces of processing executed by the second processing device 230 includes the following pieces of processing. That is, one piece of the processing is to acquire the captured image GC by imaging the projection surface SP when an input for instructing to perform imaging is received through the second image (FIG. 6: step Sa12, FIG. 7: step Sa23, step Sa29). One piece of the processing is to generate correction data for correcting the shape of the target image GO based on the captured image GC (FIG. 6: step Sa10, FIG. 7: step Sa24, step Sa30).

Through the series of pieces of processing executed by the second processing device 230, it is possible to prevent a situation in which normal correction data cannot be obtained because a part of the projection image GP is not captured in the captured image GC.

In the embodiment, the second image includes information for notifying that the portable information processing apparatus 20 is held in a posture in which the short side ASD of the display 210 is closer to the vertical CV than to the horizontal CH. In the embodiment, the information includes the character string information H52, H92, and H102.

Accordingly, an instruction to hold the information processing apparatus 20 in lateral holding is more reliably transmitted to a user U.

In the embodiment, the imaging range B in which the portable information processing apparatus 20 images the projection surface SP has the long side ALB and the short side ASB, the short side ASB of the imaging range B is along the short side ASD of the display 210, and the long side ALB of the imaging range B is along the long side SLD of the display 210.

Accordingly, the captured image GC including the entire projection image GP is more reliably acquired by holding the information processing apparatus 20 in lateral holding.

2. Modifications

The embodiment described above can be modified in various forms. Examples of specific modifications applicable to the embodiment described above will be described as follows. Two or more modifications freely selected from the following examples can be combined with each other as appropriate as long as there is no technical contradiction.

First Modification

The first pattern image GOP1 used in the first method is not limited to the pattern illustrated in FIG. 4. That is, the first pattern image GOP1 may be a pattern in which the dots E have a non-uniform luminance distribution and the dots E are surrounded by a region painted with a single color. By using this pattern, an influence of a noise at the time of imaging is prevented when the dots E are detected.

The pattern of the second pattern image GOP2 used in the second method is not limited to the checker pattern. For example, a cross line pattern in which a cross line is provided at a position corresponding to the checker corner PTC and a pattern in which an ArUco marker is provided at a position corresponding to the checker corner PTC may be used instead of the checker pattern.

Second Modification

When the user interface image GAU corresponding to the second image is displayed on the display 210, a user U may be notified to hold the portable information processing apparatus 20 in a posture in which the short side ASD of the display 210 is closer to the vertical CV than to the horizontal CH as follows. That is, the information processing apparatus 20 executes at least one of the following first processing to fourth processing instead of displaying the character string information H52, H92, and H102 or executes the at least one processing together with the display of the character string information H52, H92, and H102.

The first processing is processing of performing the notification by changing viewfinder videos in the viewfinder display regions H51, H91, and H101 to another video.

Figure 12:
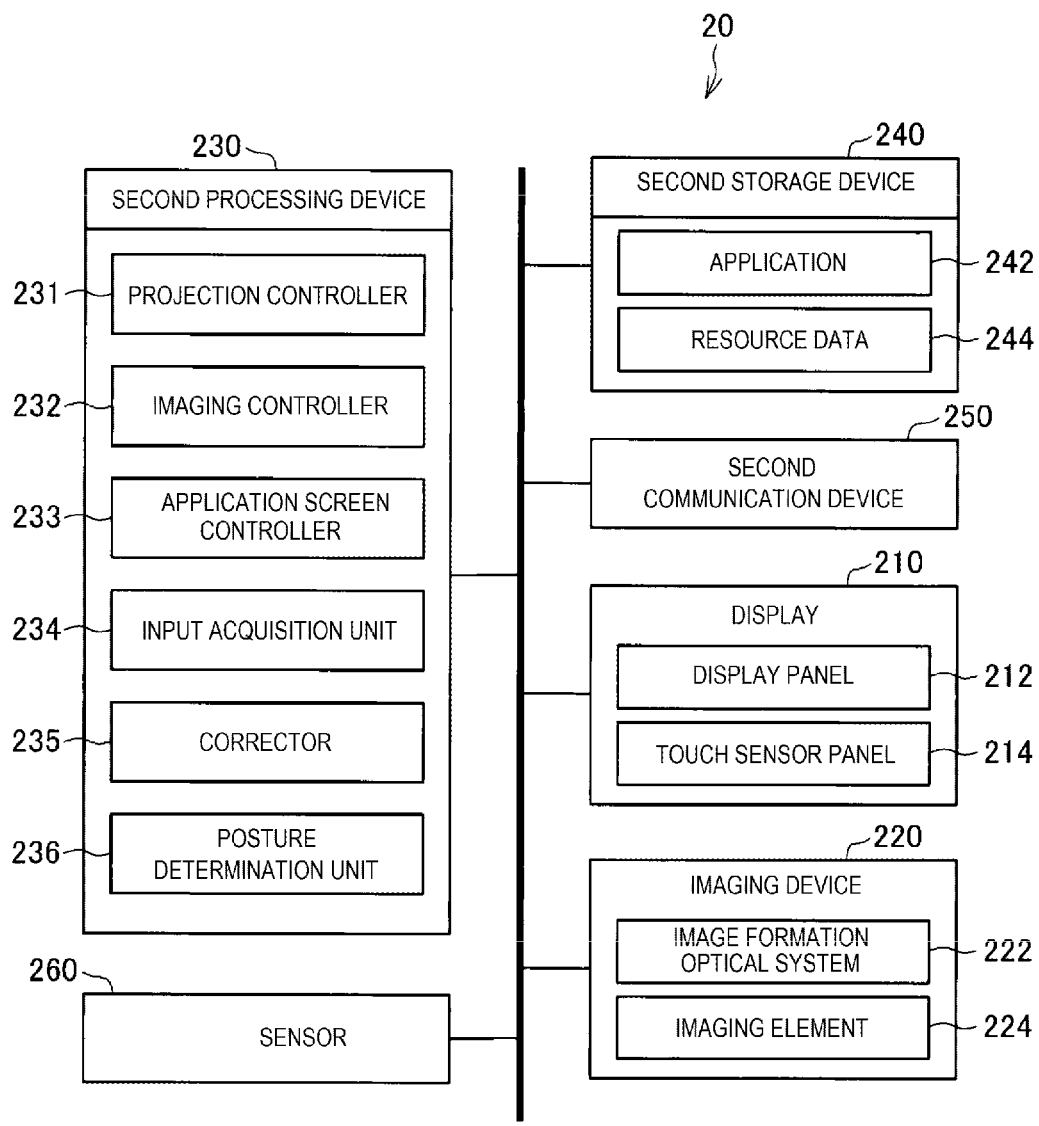
FIG. 12 is a diagram illustrating an example of an information processing apparatus according to a modification.

Specifically, as illustrated in FIG. 12, the information processing apparatus 20 includes a sensor 260 that detects a posture of the information processing apparatus 20, and the second processing device 230 executes the following operation when the second image is displayed. That is, when an output of the sensor 260 indicates that the information processing apparatus 20 is in vertical holding, the second processing device 230 switches the viewfinder videos in the viewfinder display regions H51, H91, and H101 to another video such as a sandstorm video. By switching the videos, it is suggested to the user U that imaging cannot be performed in the state of vertical holding. The video may be a moving image or a still image. The sensor 260 is, for example, an acceleration sensor or a gyro sensor.

The second processing is processing of performing the notification by rotating the viewfinder videos in the viewfinder display regions H51, H91, and H101 by 90 degrees.

Specifically, the information processing apparatus 20 has the configuration illustrated in FIG. 12, and the second processing device 230 executes the following operation when the second image is displayed. That is, when the output of the sensor 260 indicates that the information processing apparatus 20 is held in vertical holding, the second processing device 230 displays viewfinder videos in the viewfinder display regions H51, H91, and H101 in a state of being rotated by 90 degrees. When the viewfinder videos are displayed by being rotated by 90 degrees, it is suggested to the user U that the information processing apparatus 20 needs to be rotated by 90 degrees to lateral holding.

The third processing is processing of performing the notification by vibration of a vibrator.

Specifically, the information processing apparatus 20 further includes a vibrator in addition to the configuration illustrated in FIG. 12. When the second image is displayed, the second processing device 230 performs the following operation. That is, the information processing apparatus 20 has the configuration illustrated in FIG. 12, and when the output of the sensor 260 indicates that the information processing apparatus 20 is held in vertical holding, the second processing device 230 causes the vibrator to output, for example, a vibration that gives a negative feeling to a user U, such as "buzz, buzz". Thereafter, when a user U holds the information processing apparatus 20 in lateral holding, the vibrator outputs, for example, a vibration that gives a positive feeling to a user U, such as "bu, bu", and stops the vibration.

The fourth processing is processing of performing the notification using the projection image GP from the projector 10.

Specifically, the information processing apparatus 20 has the configuration illustrated in FIG. 12, and when the output of the sensor 260 indicates that the information processing apparatus 20 is held in vertical holding, the second processing device 230 outputs a signal for causing the projector 10 to project an image for notifying a user U to hold the information processing apparatus 20 in lateral holding. Thereafter, when the output of the sensor 260 indicates that the information processing apparatus 20 is held in a lateral holding, the second processing device 230 causes the projector 10 to stop the projection of the image for notifying a user U to hold the information processing apparatus 20 in lateral holding. When the second image is displayed by the information processing apparatus 20, the second processing device 230 may output a signal for causing the projector 10 to project an image for notifying a user U to hold the information processing apparatus 20 in lateral holding during a period in which the second image is displayed, or may output the signal before the second image is displayed, for example, when an image is transitioned from the first image to the second image.

Through the first processing to the fourth processing, an instruction to hold the information processing apparatus 20 in lateral holding is more reliably transmitted to the user U.

Third Modification

The information processing apparatus 20 may display the user interface image GAU corresponding to the first image in an orientation corresponding to a posture of the information processing apparatus 20.

Specifically, the information processing apparatus 20 has the configuration illustrated in FIG. 12. The second processing device 230 performs the following operation in processing of displaying the first image on the display 210 (FIG. 11: steps Sb1, Sb3, Sb5, and Sb7). That is, based on the output of the sensor 260, the second processing device 230 displays the first image on the display 210 in one of the first orientation K1 in which the first image is along the long side ALD of the display 210 and the second orientation K2 in which the first image is along the short side ASD of the display 210.

Through the processing, the first image is displayed in an appropriate orientation according to a posture of the information processing apparatus 20, that is, a manner of holding the information processing apparatus 20 by a user U.

Fourth Modification

In the fourth modification, the second processing device 230 of the information processing apparatus 20 may further execute the following processing. That is, in the processing of displaying the first image on the display 210 (FIG. 11: steps Sb1, Sb3, Sb5, and Sb6), when the output of the sensor 260 indicates that the long side ALD of the display 210 is closer to the vertical CV than to the horizontal CH, the second processing device 230 displays the first image in the first orientation K1 in which the first image is along the long side ALD of the display 210. In the processing of displaying the second image in the second orientation K2 in which the second image is along the short side ASD of the display 210 (FIG. 11: steps Sb4 and Sb7), the second processing device 230 displays the first image in the first orientation K1 in which the first image is along the long side ALD of the display 210, and then displays the second image in the second orientation K2 in which the second image is along the short side ASD of the display 210.

Through this processing, even when the first image immediately before the second image is displayed in the first orientation K1, since the second image is displayed in the second orientation K2, a user U is induced to perform an operation of holding the information processing apparatus 20 in lateral holding.

Fifth Modification

The information processing apparatus 20 is not limited to being implemented by one computer, and may include a plurality of computers. Specifically, functional units provided in the second processing device 230 of the information processing apparatus 20 may be implemented by processors included in respective ones of the plurality of computers.

Sixth Modification

One or more of the functional units provided in the second processing device 230 of the information processing apparatus 20 may be provided in the first processing device 100 of the projector 10. In this case, at least a part of the application 242 and the resource data 244 may be stored in the first storage device 120 of the projector 10.

Seventh Modification

In the second method, step Sa25 to step Sa30 may be omitted. That is, the second correction data generated based on the second pattern image GOP2 without using the third pattern image GOP3 may be transmitted to the projector 10 in step Sa31. In this case, a size of the pattern portion PT in the second pattern image GOP2 may be set to a size according to the certainty that the pattern portion PT falls within the projection range and the accuracy of a correction amount, and may be different from that in the embodiment described above.

3. Summary of Present Disclosure

Hereinafter, a summary of the present disclosure will be added.

APPENDIX 1

An image correction method including: receiving an input of selecting one of a first method for correcting a shape of an image projected from a projector onto a projection surface and a second method that is a method for correcting the shape of the image and is different from the first method; outputting a signal for causing the projector to project a first pattern image when the first method is selected; generating first correction data for correcting the shape of the image using the first method based on a first captured image that is acquired by imaging the projection surface and includes the projection surface and a first projection image appearing on the projection surface by projecting the first pattern image; outputting a signal for causing the projector to project a second pattern image different from the first pattern image when the second method is selected; and generating second correction data for correcting the shape of the image using the second method based on a second captured image that is acquired by imaging the projection surface and includes the projection surface and a second projection image appearing on the projection surface by projecting the second pattern image.

According to Appendix 1, convenience for a user is improved.

APPENDIX 2

The image correction method according to Appendix 1, in which receiving the input includes receiving a selection as to whether the projection surface includes a contour defining a projection range.

According to Appendix 2, a correction can be appropriately performed by selecting the first method or the second method depending on whether the projection surface includes the contour defining the projection range.

APPENDIX 3

The image correction method according to Appendix 1 or 2, in which the first method includes correcting the shape of the image based on a shape of a surface of the projection surface.

According to Appendix 3, a correction corresponding to a case where the surface of the projection surface is not a flat surface can be appropriately performed by using the first pattern image.

APPENDIX 4

The image correction method according to any one of Appendixes 1 to 3, in which the second method includes correcting a projection image, appearing on the projection surface by causing the projector to project the image, such that the projection image falls within a projection range of the projection surface.

According to Appendix 4, a correction for making the projection image fall within the contour of the projection range can be appropriately performed by using the second pattern image.

APPENDIX 5

The image correction method according to Appendix 4, further including: outputting a signal for causing the projector to project a third pattern image different from the first pattern image and the second pattern image when the second method is selected, in which generating the second correction data includes generating the second correction data for correcting the shape of the image using the second method based on the second captured image and a third captured image that is acquired by imaging the projection surface and includes the projection surface and a third projection image appearing on the projection surface by projecting the third pattern image.

According to Appendix 5, the second correction data is more accurately obtained.

APPENDIX 6

The image correction method according to any one of Appendixes 1 to 5, in which the second pattern image has fewer detection points than the first pattern image.

According to Appendix 6, it is possible to speed up processing using the second pattern image. In addition, in the generation of the second correction data, resistance to a detection error and a noise is increased.

APPENDIX 7

An information processing apparatus including: a processing device, in which the processing device is configured to receive an input of selecting one of a first method for correcting a shape of an image projected from a projector onto a projection surface and a second method that is a method for correcting the shape of the image and is different from the first method, output a signal for causing the projector to project a first pattern image when the first method is selected, generate first correction data for correcting the shape of the image using the first method based on a first captured image that is acquired by imaging the projection surface and includes the projection surface and a first projection image appearing on the projection surface by projecting the first pattern image, output a signal for causing the projector to project a second pattern image different from the first pattern image when the second method is selected, and generate second correction data for correcting the shape of the image using the second method based on a second captured image that is acquired by imaging the projection surface and includes the projection surface and a second projection image appearing on the projection surface by projecting the second pattern image.

According to Appendix 7, the same effect as that of Appendix 1 is obtained.

APPENDIX 8

A non-transitory computer-readable storage medium storing a program, the program causing a computer to execute processing including: receiving an input of selecting one of a first method for correcting a shape of an image projected from a projector onto a projection surface and a second method that is a method for correcting the shape of the image and is different from the first method; outputting a signal for causing the projector to project a first pattern image when the first method is selected; generating first correction data for correcting the shape of the image using the first method based on a first captured image that is acquired by imaging the projection surface and includes the projection surface and a first projection image appearing on the projection surface by projecting the first pattern image; outputting a signal for causing the projector to project a second pattern image different from the first pattern image when the second method is selected; and generating second correction data for correcting the shape of the image using the second method based on a second captured image that is acquired by imaging the projection surface and includes the projection surface and a second projection image appearing on the projection surface by projecting the second pattern image.

According to Appendix 8, the same effect as that of Appendix 1 is obtained.

What is claimed is:

1. An image correction method comprising:
   receiving an input of selecting one of a first method for correcting a shape of an image projected from a projector onto a projection surface and a second method that is a method for correcting the shape of the image and is different from the first method;
   outputting a signal for causing the projector to project a first pattern image when the first method is selected;
   generating first correction data for correcting the shape of the image using the first method based on a first captured image that is acquired by imaging the projection surface and includes the projection surface and a first projection image appearing on the projection surface by projecting the first pattern image;
   outputting a signal for causing the projector to project a second pattern image different from the first pattern image when the second method is selected; and
   generating second correction data for correcting the shape of the image using the second method based on a second captured image that is acquired by imaging the projection surface and includes the projection surface and a second projection image appearing on the projection surface by projecting the second pattern image.

2. The image correction method according to claim 1, wherein
   the receiving the input includes receiving a selection as to whether the projection surface includes a contour defining a projection range.

3. The image correction method according to claim 1, wherein
   the first method includes correcting the shape of the image based on a shape of a surface of the projection surface.

4. The image correction method according to claim 1, wherein the second method includes correcting a projection image, appearing on the projection surface by causing the projector to project the image, such that the projection image falls within a projection range of the projection surface.

5. The image correction method according to claim 4, further comprising:
outputting a signal for causing the projector to project a third pattern image different from the first pattern image and the second pattern image when the second method is selected, wherein
the generating the second correction data includes generating the second correction data for correcting the shape of the image using the second method based on the second captured image and a third captured image that is acquired by imaging the projection surface and includes the projection surface and a third projection image appearing on the projection surface by projecting the third pattern image.

6. The image correction method according to claim 1, wherein
the second pattern image has fewer detection points than the first pattern image.

7. An information processing apparatus comprising:
a processing device, wherein
the processing device programmed to execute
receiving an input of selecting one of a first method for correcting a shape of an image projected from a projector onto a projection surface and a second method that is a method for correcting the shape of the image and is different from the first method,
outputting a signal for causing the projector to project a first pattern image when the first method is selected,
generating first correction data for correcting the shape of the image using the first method based on a first captured image that is acquired by imaging the projection surface and includes the projection surface and a first projection image appearing on the projection surface by projecting the first pattern image,
outputting a signal for causing the projector to project a second pattern image different from the first pattern image when the second method is selected, and
generating second correction data for correcting the shape of the image using the second method based on a second captured image that is acquired by imaging the projection surface and includes the projection surface and a second projection image appearing on the projection surface by projecting the second pattern image.

8. A non-transitory computer-readable storage medium storing a program, the program causing a computer to execute processing comprising:
receiving an input of selecting one of a first method for correcting a shape of an image projected from a projector onto a projection surface and a second method that is a method for correcting the shape of the image and is different from the first method;
outputting a signal for causing the projector to project a first pattern image when the first method is selected;
generating first correction data for correcting the shape of the image using the first method based on a first captured image that is acquired by imaging the projection surface and includes the projection surface and a first projection image appearing on the projection surface by projecting the first pattern image;
outputting a signal for causing the projector to project a second pattern image different from the first pattern image when the second method is selected; and
generating second correction data for correcting the shape of the image using the second method based on a second captured image that is acquired by imaging the projection surface and includes the projection surface and a second projection image appearing on the projection surface by projecting the second pattern image.

* * * * *